United States Patent
Li et al.

(10) Patent No.: US 9,756,641 B2
(45) Date of Patent: Sep. 5, 2017

(54) DYNAMIC SIGNALING OF LTE-TDD CONFIGURATIONS IN THE PRESENCE OF D2D TRANSMISSIONS

(71) Applicant: QUALCOMM Incorporated, San Diego, CA (US)

(72) Inventors: Chong Li, Jersey City, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/793,621

(22) Filed: Jul. 7, 2015

(65) Prior Publication Data

US 2017/0013605 A1    Jan. 12, 2017

(51) Int. Cl.
*H04J 3/00* (2006.01)
*H04W 72/04* (2009.01)
(Continued)

(52) U.S. Cl.
CPC ............. *H04W 72/048* (2013.01); *H04L 5/14* (2013.01); *H04W 72/042* (2013.01);
(Continued)

(58) Field of Classification Search
None
See application file for complete search history.

(56) References Cited

U.S. PATENT DOCUMENTS

2013/0150061 A1*  6/2013  Shin ................. H04W 4/005
                                                            455/450
2013/0194980 A1*  8/2013  Yin .................. H04L 1/1854
                                                            370/280
(Continued)

FOREIGN PATENT DOCUMENTS

WO    2012019348 A1    2/2012
WO    2014004314 A2    1/2014
WO    2014180342 A1    11/2014

OTHER PUBLICATIONS

3GPP TR 36.828: "3rd Generation Partnership Project, Technical Specification Group Radio Access Network, Evolved Universal Terrestrial Radio Access (E-UTRA), Further enhancements to LTE Time Division Duplex (TDO) for Downlink-Uplink (DL-UL) Interference Management and Traffic Adaptation (Release 11)", 3rd Generation Partnership Project (3GPP), Mobile Competence Centre, 650, Route Des Lucioles, F-06921 Sophia-Antipolis Cedex, France, vol. RAN WG1, No. V11.0.0, Jun. 26, 2012 (Jun. 26, 2012), pp. 1-109, XP050580751, [retrieved on Jun. 26, 2012] * chapter 4, 6.1, 7.

(Continued)

*Primary Examiner* — Otis L Thompson, Jr.
(74) *Attorney, Agent, or Firm* — Arent Fox, LLP

(57) ABSTRACT

A method, an apparatus, and a computer program product for wireless communication are provided. The apparatus may be a UE. The apparatus receives a D2D resource message based on a change in an uplink-downlink subframe configuration of at least one frame. The D2D resource message enables the apparatus to determine D2D resources allocated for D2D transmissions after the change in the uplink-downlink subframe configuration. The apparatus determines a subset of the D2D resources to be used for performing D2D transmissions based on the received D2D resource message.

30 Claims, 15 Drawing Sheets

(51) Int. Cl.
*H04W 72/12* (2009.01)
*H04W 76/02* (2009.01)
*H04W 76/04* (2009.01)
*H04L 5/14* (2006.01)
*H04W 72/08* (2009.01)
*H04W 72/14* (2009.01)

(52) U.S. Cl.
CPC ... *H04W 72/0446* (2013.01); *H04W 72/0486* (2013.01); *H04W 72/1252* (2013.01); *H04W 72/1294* (2013.01); *H04W 76/023* (2013.01); *H04W 76/043* (2013.01); *H04W 72/082* (2013.01); *H04W 72/14* (2013.01)

(56) References Cited

U.S. PATENT DOCUMENTS

| | | | |
|---|---|---|---|
| 2014/0056185 A1* | 2/2014 | Yu | H04W 28/18 370/280 |
| 2014/0098719 A1 | 4/2014 | Kim et al. | |
| 2014/0269338 A1 | 9/2014 | Jung et al. | |
| 2014/0321313 A1* | 10/2014 | Seo | H04J 11/00 370/252 |
| 2015/0009910 A1* | 1/2015 | Ryu | H04W 72/04 370/329 |
| 2015/0043398 A1* | 2/2015 | Fwu | H04L 5/0058 370/280 |
| 2015/0043434 A1* | 2/2015 | Yamada | H04W 72/0446 370/329 |
| 2015/0334756 A1* | 11/2015 | Lu | H04W 76/023 370/329 |
| 2015/0358981 A1* | 12/2015 | Chae | H04W 76/023 370/252 |
| 2016/0302209 A1* | 10/2016 | Behravan | H04L 5/001 |
| 2016/0323870 A1* | 11/2016 | Wei | H04W 72/042 |

OTHER PUBLICATIONS

3GPP TS 36.213: "3rd Generation Partnership Project, Technical Specification Group Radio Access Network, Evolved Universal Terrestrial Radio Access (E-UTRA), Physical layer procedures (Release 12)", 3GPP Standard, 3rd Generation Partnership Project (3GPP), Mobile Competence Centre; 650, Route Des Lucioles, F-06921 Sophia-Antipolis Cedex, France, vol. RAN WG1, No. V12.6.0, Jul. 3, 2015 (Jul. 3, 2015), pp. 220-233, XP050965826, [retrieved on Jul. 3, 2015] * chapters 14.1.1, 14.1.3, 14.1.4, 14.2,14. 2.1, 14.2.3, 14.3.3*.

3GPP TS 36.321: "3rd Generation Partnership Project, Technical Specification Group Radio Access Network, Evolved Universal Terrestrial Radio Access (E-UTRA), Medium Access Control (MAC) protocol specification (Release 12)", 3GPP Standard, 3rd Generation Partnership Project (3GPP), Mobile Competence Centre, 650, Route Des Lucioles, F-06921 Sophia-Antipolis Cedex, France, vol. RAN WG2, No. V12.6.0, Jun. 30, 2015 (Jun. 30, 2015), pp. 1-77, XP050965799, [retrieved on Jun. 30, 2015] *chapters 3.2, 4.2.1, 4.4, 4.5, 5.7, 5.14, 5.15, 7.1 *.

3GPP TS 36.331: "3rd Generation Partnership Project, Technical Specification Group Radio Access Network, Evolved Universal Terrestrial Radio Access (E-UTRA), Radio Resource Control (RRC), Protocol Specification (Release 12)", 3GPP Standard, 3rd Generation Partnership Project (3GPP), Mobile Competence Centre, 650, Route Des Lucioles, F-06921 Sophia-Antipolis Cedex, France, vol. RAN WG2, No. V12.6.0, Jun. 30, 2015 (Jun. 30, 2015), pp. 1-449, XP050965796, [retrieved on Jun. 30, 2015] * chapters 3.2, 5.2.2.25, 5.3.5. 5.3.10.15, 5.10 *.

HTC: "Physical Layer Considerations on D2D Comnunication", 3GPP draft, R1-132654 Physical Layer Considerations on D2D Comnunication, 3rd Generation Partnership Project (3GPP), Mobile Competence Centre, 650, Route Des Lucioles, F-06921 Sophia-Antipolis Cedex vol. RAN WG1, No. Fukuoka, Japan, May 20, 2013-May 24, 2013 May 21, 2013 (May 21, 2013), XP050698406, pp. 1-2, Retrieved from the Internet: URL:http://www.3gpp.org/ftp/tsg_ran/WG1_RL1/TSGR1_73/Docs/ [retrieved on May 21, 2013]* chapters 1-3 *.

International Search Report and Written Opinion—PCT/US2016/035805—ISA/EPO—dated Aug. 26, 2016.

* cited by examiner

800

| UL-DL CFG | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

■ Anchor subframes
▨ Special non-anchor subframes
☐ Non-anchor subframes

DYNAMIC SIGNALING OF LTE-TDD CONFIGURATIONS IN THE PRESENCE OF D2D TRANSMISSIONS

BACKGROUND

Field

The present disclosure relates generally to communication systems, and more particularly, to dynamic signaling of Long Term Evolution Time-Division Duplex (LTE-TDD) configurations in the presence of device-to-device (D2D) transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). In one aspect, the apparatus receives a D2D resource message based on a change in an uplink-downlink subframe configuration of at least one frame. The D2D resource message enables the apparatus to determine D2D resources allocated for D2D transmissions after the change in the uplink-downlink subframe configuration. The apparatus determines a subset of the D2D resources to be used for performing D2D transmissions based on the received D2D resource message.

In another aspect, the apparatus includes means for receiving a D2D resource message based on a change in an uplink-downlink subframe configuration of at least one frame. The D2D resource message enables the apparatus to determine D2D resources allocated for D2D transmissions after the change in the uplink-downlink subframe configuration. The apparatus includes means for determining a subset of the D2D resources to be used for performing D2D transmissions based on the received D2D resource message. The apparatus may include means for receiving a configuration update message based on the change in the uplink-downlink subframe configuration of the at least one frame, in which the configuration update message indicates a set of downlink subframes and a set of uplink subframes. In an aspect, the means for determining the subset of D2D resources to be used for performing D2D transmissions may be configured to identify a downlink subframe previously configured as an uplink subframe and previously associated with resources allocated for D2D transmissions and to refrain from performing D2D transmissions on the identified downlink subframe. In another aspect, the means for determining the subset of D2D resources to be used for performing D2D transmissions may be configured to decode the D2D resource message based on an identifier associated with D2D transmissions. In another aspect, the apparatus may include means for receiving the identifier associated with D2D transmissions in a system information block. In another aspect, the D2D resource message indicates the D2D resources, in a set of uplink subframes, allocated for D2D transmissions. In another aspect, the D2D resource message is transmitted in a PDCCH. In another aspect, the D2D resource message identifies a resource on which a D2D information message will be transmitted, and the D2D information message indicates the D2D resources, in a set of uplink subframes, allocated for D2D transmissions. In another aspect, the apparatus includes means for receiving the D2D information message on the resource identified in the D2D resource message. In another aspect, the D2D resource message is received in a physical downlink control channel (PDCCH) and the D2D information message is received in a physical downlink shared channel (PDSCH). In another aspect, the D2D information message includes a bitmap that indicates one or more subframes of the at least one frame that will be converted to a downlink subframe or converted to an uplink subframe based on the change in the uplink-downlink subframe configuration.

In another aspect, the computer-readable medium is associated with a UE and stores computer executable code for wireless communication. The computer-readable medium includes code for receiving a D2D resource message based on a change in an uplink-downlink subframe configuration of at least one frame. The D2D resource message enables the UE to determine D2D resources allocated for D2D transmissions after the change in the uplink-downlink subframe configuration. The computer-readable medium includes code for determining a subset of the D2D resources to be used for performing D2D transmissions based on the received D2D resource message. In an aspect, the computer-readable medium includes code for receiving a configuration update message based on the change in the uplink-downlink subframe configuration of the at least one frame. The configuration update message indicates a set of downlink subframes and a set of uplink subframes. In another aspect, the code for determining the subset of D2D resources to be used for performing D2D transmissions may include code for identifying a downlink subframe previously configured as an uplink subframe and previously associated with resources allocated for D2D transmissions and for refraining from performing D2D transmissions on the identified downlink subframe. In another aspect, the code for determining the subset of D2D resources to be used for performing D2D transmissions may include code for decoding the D2D resource message based on an identifier associated with D2D transmissions. In another aspect, the computer-readable medium may include code for receiving the identifier associated with D2D transmissions in a system information block. In another aspect, the D2D resource message indicates the D2D resources, in a set of uplink subframes, allocated for D2D transmissions. In another aspect, the D2D resource message is transmitted in a PDCCH. In another aspect, the D2D resource message identifies a resource on which a D2D information message will be transmitted, in which the D2D information message indicates the D2D resources, in a set of uplink subframes, allocated for D2D transmissions. In another aspect, the computer-readable medium may include code for receiving the D2D information message on the resource identified in the D2D resource message. In another aspect, the D2D resource message is received in a PDCCH and the D2D information message is received in a PDSCH. In another aspect, the D2D information message includes a bitmap that indicates one or more subframes of the at least one frame that will be converted to a downlink subframe or converted to an uplink subframe based on the change in the uplink-downlink subframe configuration.

In another aspect of the disclosure, a method, a computer-readable medium, and an apparatus are provided. The apparatus may be a base station (e.g., an evolved Node B). In one aspect, the apparatus determines to reconfigure an uplink-downlink subframe configuration of at least one frame based on network traffic. The apparatus reconfigures the uplink-downlink subframe configuration based on the determination. The apparatus transmits a D2D resource message based on the reconfigured uplink-downlink subframe configuration, in which the D2D resource message enables a UE to determine D2D resources allocated for D2D transmissions based on the reconfigured uplink-downlink subframe configuration.

In another aspect, the apparatus includes means for determining to reconfigure an uplink-downlink subframe configuration of at least one frame based on network traffic. The apparatus includes means for reconfiguring the uplink-downlink subframe configuration based on the determination. The apparatus includes means for transmitting a D2D resource message based on the reconfigured uplink-downlink subframe configuration. The D2D resource message enables a UE to determine D2D resources allocated for D2D transmissions based on the reconfigured uplink-downlink subframe configuration. In an aspect, the apparatus may include means for allocating the D2D resources for D2D transmissions based on the reconfigured uplink-downlink subframe configuration. In another aspect, the reconfigured uplink-downlink subframe configuration has less uplink subframes than a previous uplink-downlink subframe configuration, and a subset of the D2D resources are allocated on a subset of uplink subframes not previously allocated for D2D transmissions in the previous uplink-downlink subframe configuration. In another aspect, the apparatus may include means for transmitting a configuration update message based on the reconfigured uplink-downlink subframe configuration of the at least one frame. The configuration update message indicates a set of downlink subframes and a set of uplink subframes. In another aspect, the apparatus may include means for transmitting an identifier associated with D2D transmissions in a system information block to enable the UE to decode the D2D resource message. In another aspect, the D2D resource message indicates the D2D resources allocated in a set of uplink subframes. In another aspect, the D2D resource message identifies a resource on which a D2D information message will be transmitted, and the D2D information message indicates the D2D resources allocated in a set of uplink subframes based on the reconfigured uplink-downlink subframe configuration. In another aspect, the apparatus may include means for transmitting the D2D information message on the resource identified in the D2D resource message. In another aspect, the D2D resource message is transmitted in a PDCCH and the D2D information message is transmitted in a PDSCH.

In another aspect, the computer-readable medium is associated with a base station and stores computer executable code for wireless communication. The computer-readable medium includes code for determining to reconfigure an uplink-downlink subframe configuration of at least one frame based on network traffic. The computer-readable medium includes code for reconfiguring the uplink-downlink subframe configuration based on the determination. The computer-readable medium includes code for transmitting a D2D resource message based on the reconfigured uplink-downlink subframe configuration, in which the D2D resource message enables a UE to determine D2D resources allocated for D2D transmissions based on the reconfigured uplink-downlink subframe configuration. In another aspect, the computer-readable medium may include code for allocating the D2D resources for D2D transmissions based on the reconfigured uplink-downlink subframe configuration. In another aspect, the reconfigured uplink-downlink subframe configuration has less uplink subframes than a previous uplink-downlink subframe configuration, and a subset of the D2D resources are allocated on a subset of uplink subframes not previously allocated for D2D transmissions in the previous uplink-downlink subframe configuration. In another aspect, the computer-readable medium may include code for transmitting a configuration update message based on the reconfigured uplink-downlink subframe configuration of the at least one frame, and the configuration update message indicates a set of downlink subframes and a set of uplink subframes. In another aspect, the computer-readable medium may include code for transmitting an identifier associated with D2D transmissions in a system information block to enable the UE to decode the D2D resource message. In another aspect, the D2D resource message indicates the D2D resources allocated in a set of uplink subframes. In another aspect, the D2D resource message identifies a resource on which a D2D information message will be transmitted, and the D2D information message indicates the D2D resources allocated in a set of uplink subframes based on the reconfigured uplink-downlink subframe configuration. In another aspect, the computer-readable medium may include code for transmitting the D2D information message on the resource identified in the D2D resource message. In another aspect, the D2D resource message is transmitted in a PDCCH and the D2D information message is transmitted in a PDSCH.

DETAILED DESCRIPTION

Figure 1:
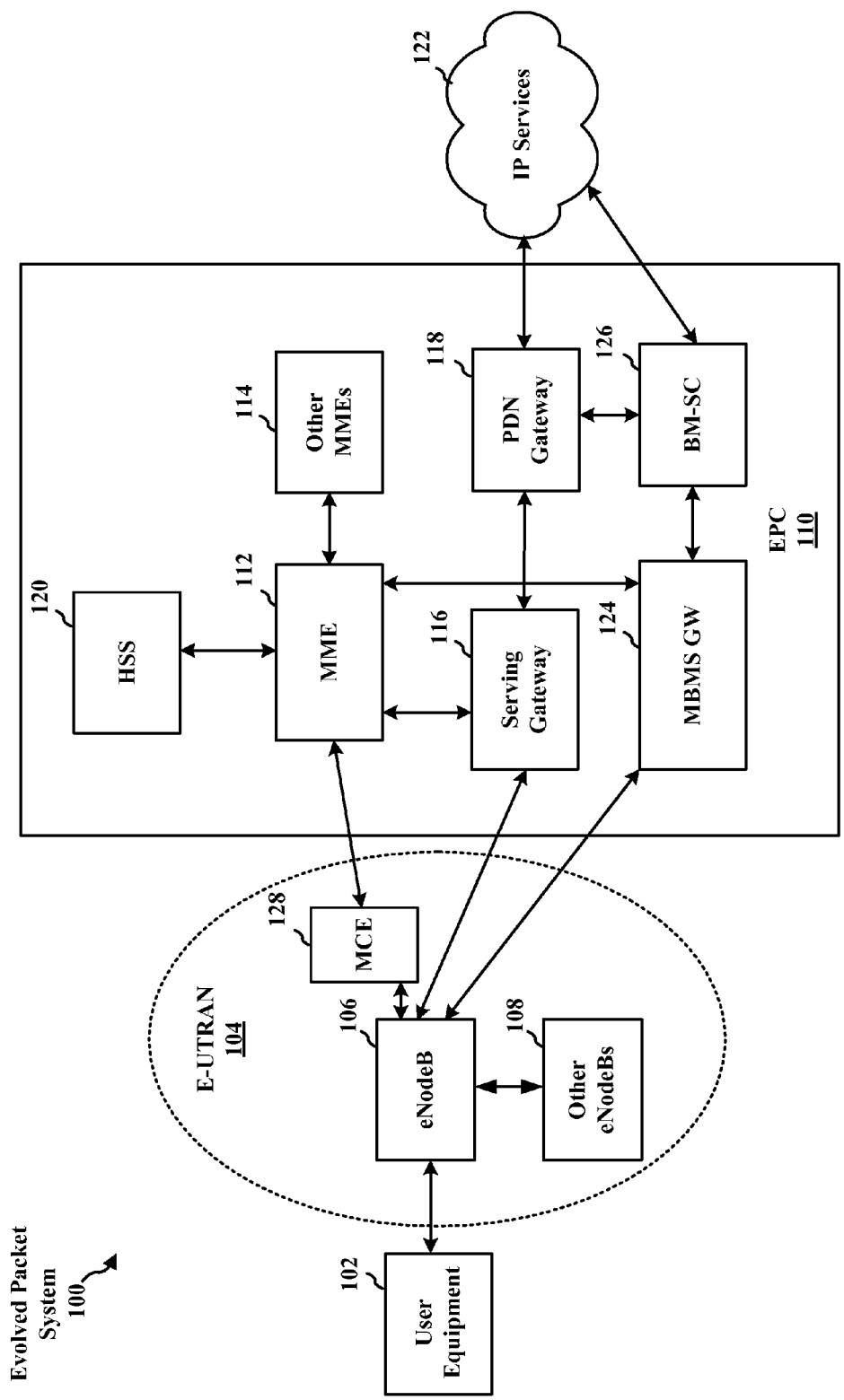
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
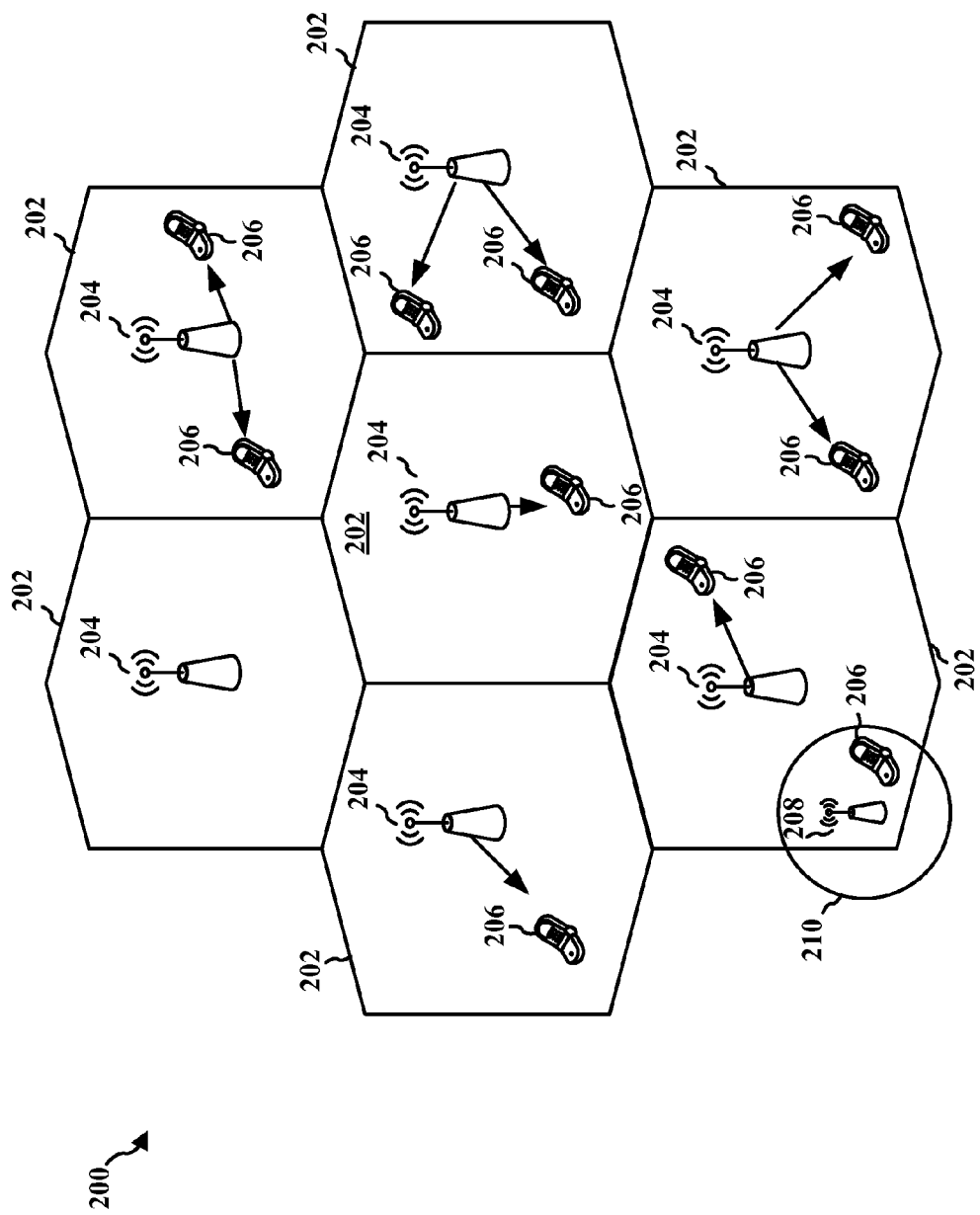
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
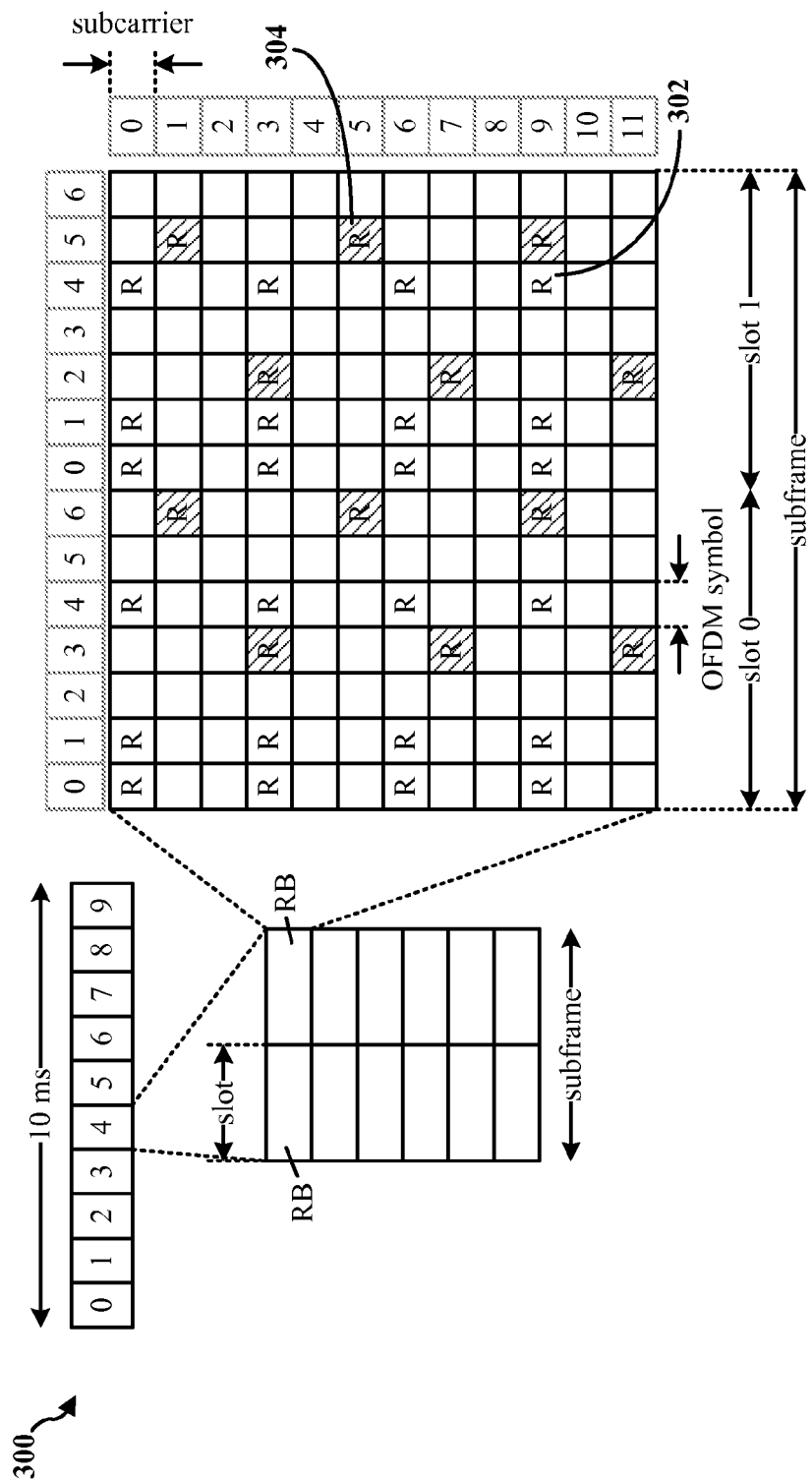
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
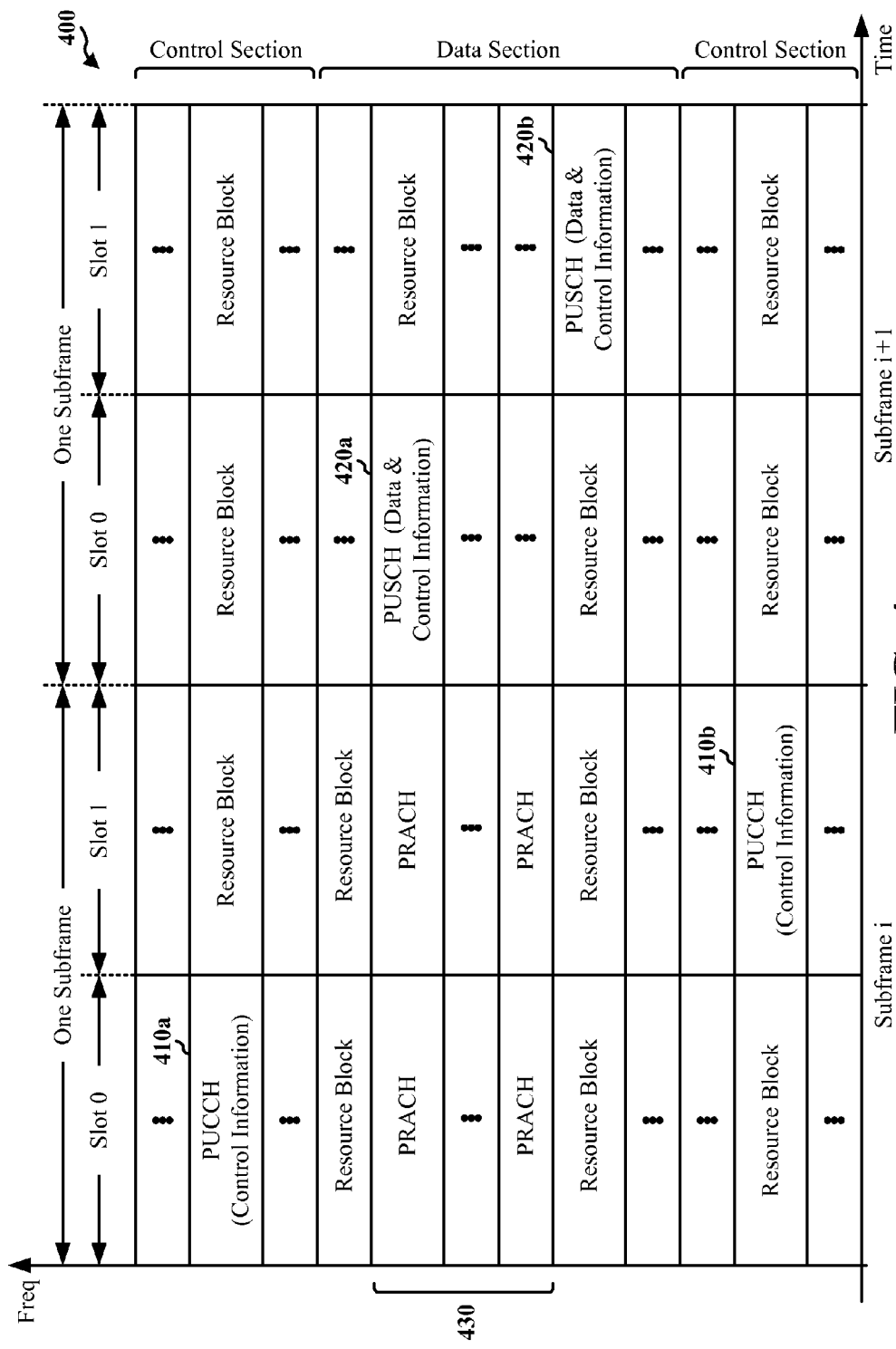
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
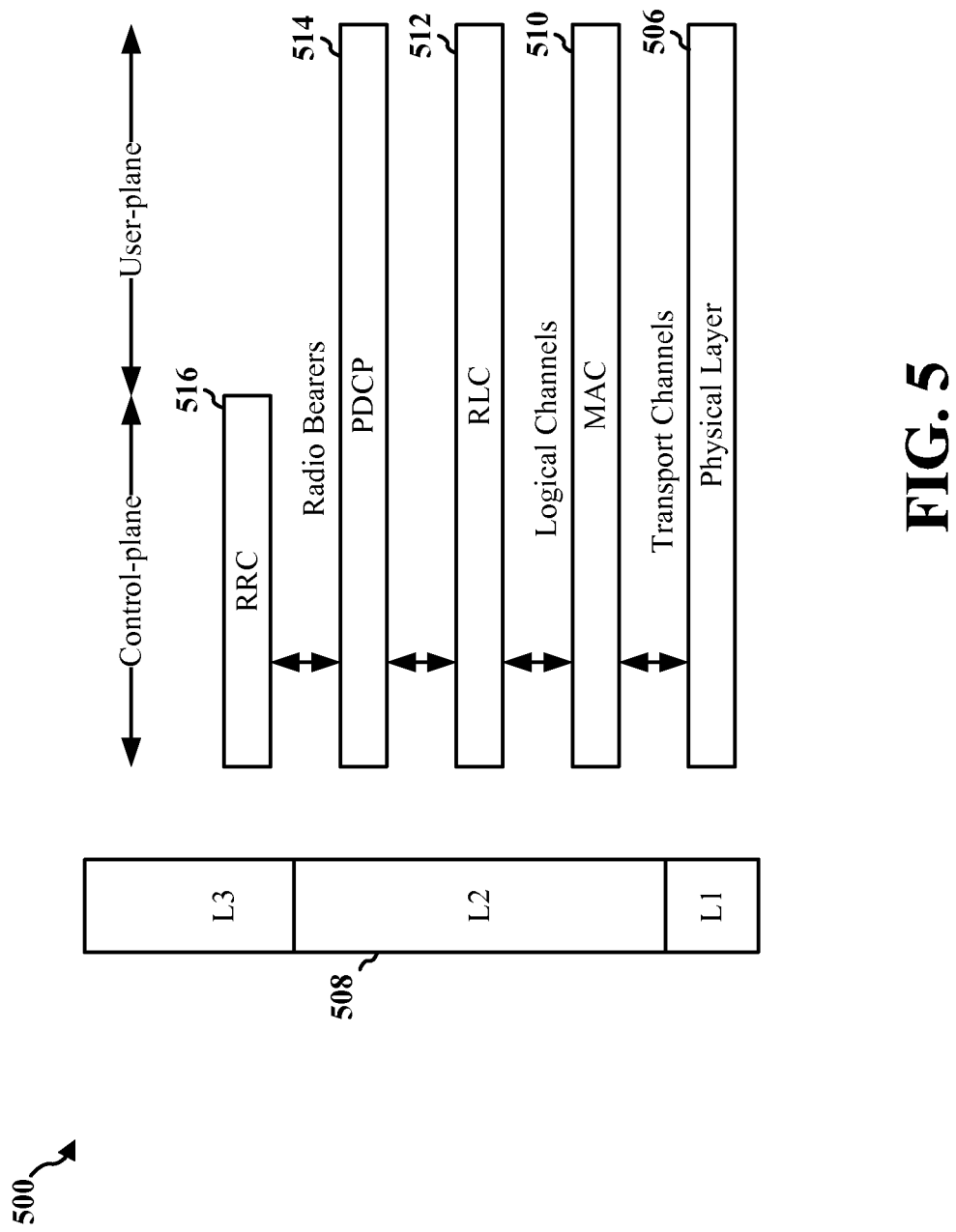
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
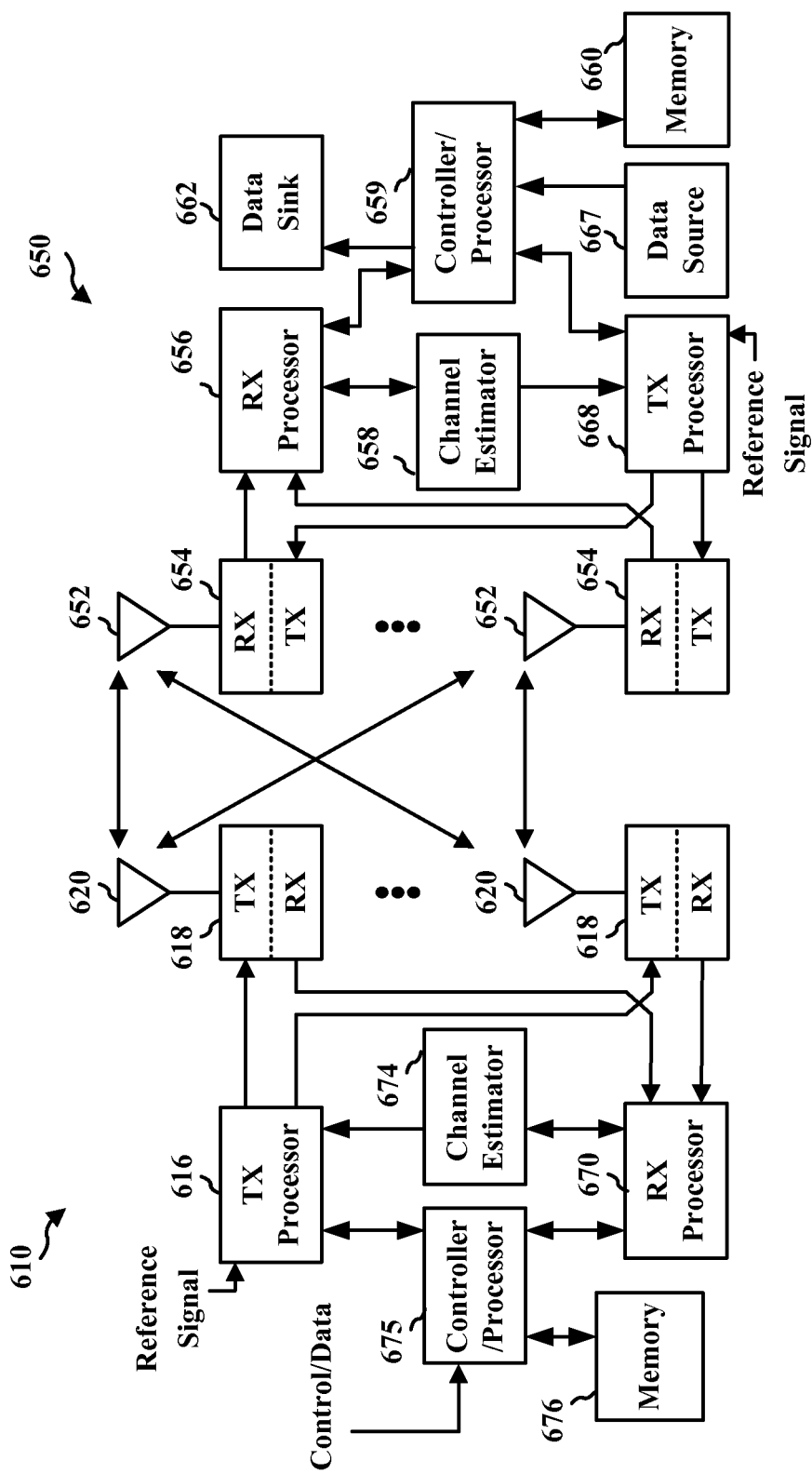
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
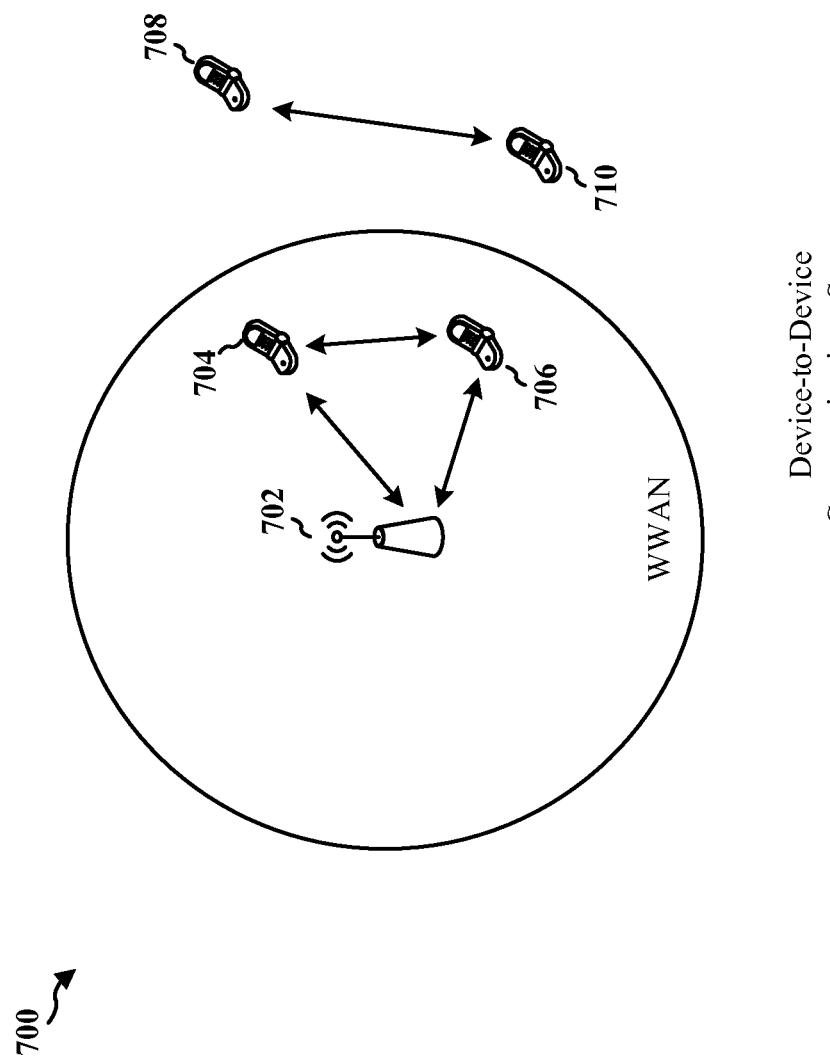
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In LTE, the UL-DL subframe configuration of a radio frame may be fixed from radio frame to radio frame. That is, for each radio frame, there may be a fixed number of subframes allocated for downlink communication and a fixed number of subframes allocated for uplink communication. However, traffic patterns may vary, and there may be times in which a greater number of downlink (or uplink) resources are required than what has been allocated. With Enhanced Interference Mitigation and Traffic Adaption (eIMTA), for example, resource configurations for TDD may be dynamically allocated, which allows for more flexible resource configurations. In eIMTA, a base station (e.g., an eNB) may initially utilize a first subframe configuration in a radio frame. Depending on traffic, the base station may adopt a second subframe configuration to accommodate changes in network traffic. For example, if downlink transmissions increase, the base station may transmit downlink data in a resource currently allocated for downlink communication but previously allocated for uplink communication.

Figures 8A, 8B:
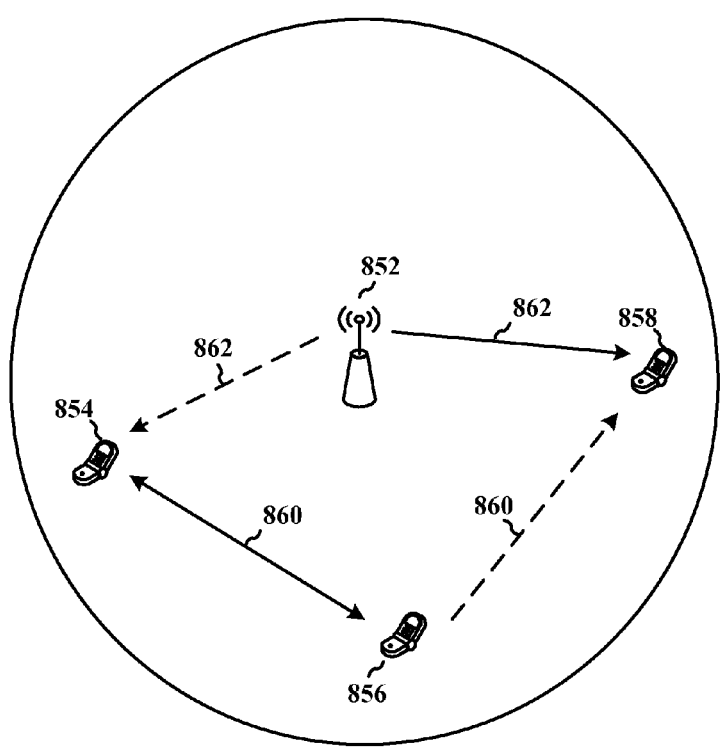
FIG. 8A is an exemplary diagram of uplink-downlink subframe configurations in LTE-TDD with eIMTA.
FIG. 8B illustrates potential interference scenarios in an eIMTA LTE-TDD network with D2D and WAN co-existence.

FIG. 8A is an exemplary diagram 800 of uplink-downlink subframe configurations in LTE-TDD with eIMTA. Referring to FIG. 8A, LTE-TDD with eIMTA may use 7 UL-DL subframe configurations for WAN communication. Each of the 7 configurations may have a set of anchor subframes and non-anchor subframes. Anchor subframes, also known as common subframes, may remain the same across different UL-DL subframe configurations. Non-anchor subframes may be changed dynamically based on traffic patterns of the network. Special non-anchor subframes may enable transition of traffic between downlink and uplink subframes. In FIG. 8A, subframes 0, 1, 2, 5 may be anchor subframes that do not change from configuration to configuration. Subframes 3, 4, 7, 8, 9 may be non-anchor subframes that may be dynamically configured based network traffic patterns (e.g., uplink subframes may be dynamically configured to be downlink subframes when traffic is downlink heavy or vice versa). Subframe 6 may be a special non-anchor subframe that may be allocated for transitions between downlink and uplink subframes (e.g., when denoted by S in UL-DL configurations 0, 1, 2, 6) or may be allocated as a downlink subframes (e.g., when denoted by D in UL-DL subframe configurations 3, 4, 5). In total, FIG. 8A depicts 7 different UL-DL subframe configurations that may be selected based on traffic adaption.

Traffic adaptation via dynamic TDD UL-DL reconfiguration has the potential of improving packet throughput and energy savings, provided that new inter-cell interference can be managed appropriately. In an aspect, a default configuration in LTE-TDD may be chosen to be uplink heavy (e.g., UL-DL subframe configurations 0, 1). When the cell becomes downlink heavy, the more downlink heavy configurations (e.g., UL-DL subframe configurations 4, 5) may be selected. Different configurations may be chosen by converting certain non-anchor uplink subframes into downlink subframes. For example, subframes 7, 8 in UL-DL configuration 1 are converted into downlink subframes in UL-DL configuration 4. By contrast, if a downlink heavy configuration is used and more uplink resources are needed, a more uplink heavy configuration may be selected.

In networks that enable D2D transmissions (e.g., D2D transmission may include D2D communications, D2D discovery, and/or D2D synchronization), semi-statically configured D2D subframes (e.g., uplink subframes with resources reserved for D2D communications) occur periodically. Due to traffic adaptation (or UL-DL subframe reconfiguration), the assigned D2D subframes may be converted from uplink into downlink subframes based on downlink traffic demand (or converted from downlink into uplink subframes based on uplink traffic demand). When uplink subframes are converted into downlink subframes, D2D transmission on subframes previously allocated for uplink may introduce interference to the eIMTA UEs that are receiving downlink data from an eNB as illustrated in FIG. 8B.

FIG. 8B illustrates potential interference scenarios in an eIMTA LTE-TDD network 850 with D2D and WAN coexistence. Referring to FIG. 8B, the eIMTA LTE-TDD network 850 includes a base station 852, a first UE 854, a second UE 856, and a third UE 858. The first UE 854 and the second UE 856 may have a D2D communication link and send or receive D2D transmissions 860 (e.g., D2D communications, D2D discovery messages, D2D synchronization messages) using uplink subframes. The base station 852 may be using UL-DL subframe configuration 0, and the first and second UEs 854, 856 may be using subframe 4, for example, for D2D transmissions. Subsequently, the third UE 858 may request a downlink transmission, which requires more downlink resources than what is offered by the UL-DL subframe configuration 0. The base station 852 may reconfigure the UL-DL configuration from configuration 0 to configuration 1, for example, after determining that additional downlink resources are needed. Having reconfigured the UL-DL subframe configuration, the base station 852 may send WAN transmissions 862 to the third UE 858 using resources in subframe 4, which was previously allocated for D2D transmissions. As shown in the dotted lines, the WAN transmissions 862 on the downlink from the base station 852 to the third UE 858 may cause interference to the first UE 854, which is receiving D2D transmissions 860 from the second UE 856 on subframe 4. Similarly, as shown again by the dotted lines, the D2D transmissions 860 may introduce interference to the third UE 858 (or other eIMTA UEs that are receiving downlink data from the eNB over resources in subframe 4). As such, a need exists to improve the coexistence of D2D transmissions in the presence of an eIMTA LTE-TDD network. Although FIG. 8B illustrates three UEs, any number of UEs may be in the cell.

Figure 9:
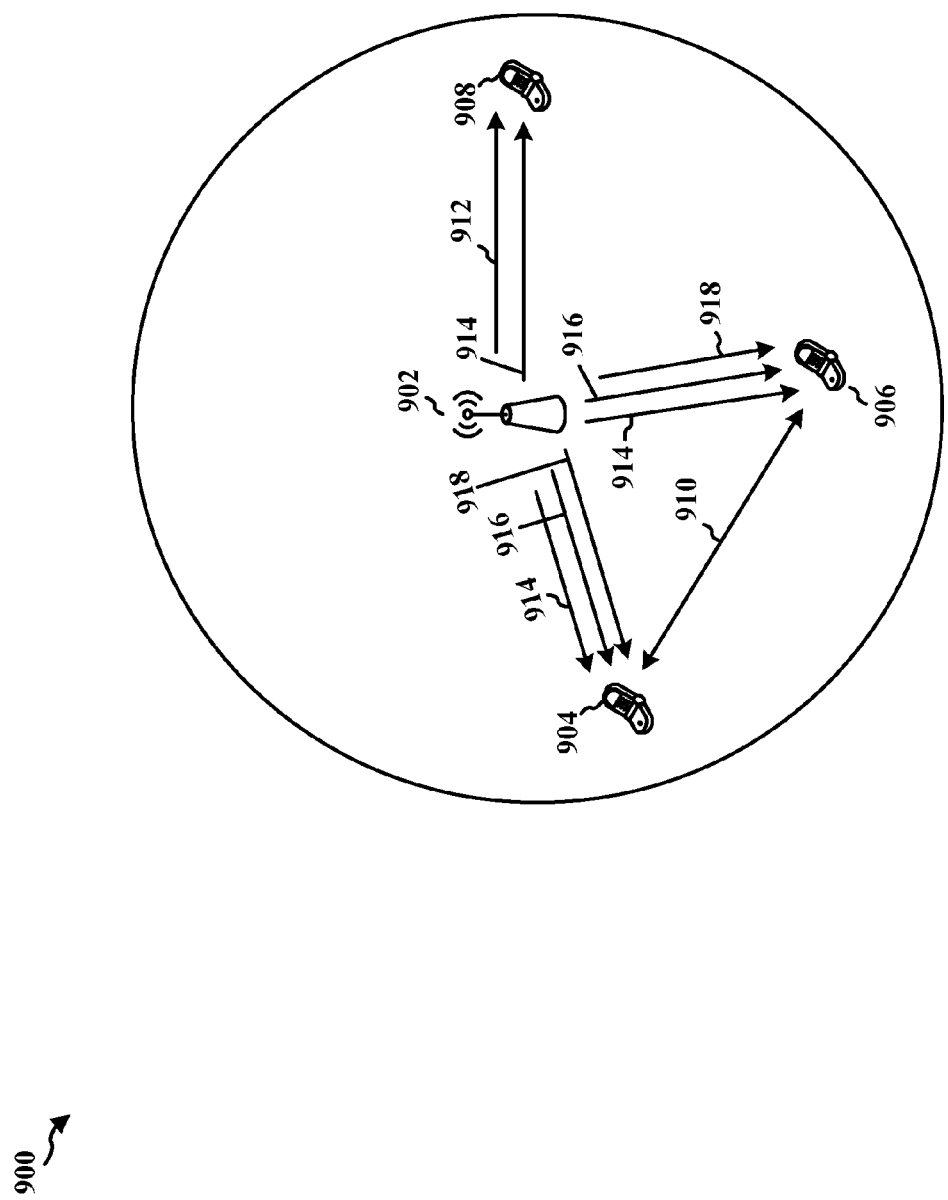
FIG. 9 illustrates a method of dynamically signaling a change in LTE-TDD configurations in the presence of D2D transmissions in a wireless network.

FIG. 9 illustrates a method of dynamically signaling a change in LTE-TDD configurations in the presence of D2D transmissions in a wireless network 900. The wireless network 900 may include a base station 902 (e.g., an eNB), a first UE 904, a second UE 906, and a third UE 908 (or any other number of eNBs and/or UEs). In an example, the base station 902 may initially use UL-DL subframe configuration 0 for WAN (and D2D) transmissions. The first and second UEs 904, 906 may be allocated D2D resources on subframes 3, 4 for D2D transmissions. As such, the first and second UEs 904, 906 may transmit and/or receive D2D transmissions 910 on D2D resources allocated in subframes 3, 4. The third UE 908 and/or other UEs (not pictured) may request downlink WAN transmissions 912 from the base station 902. For example, the third UE 908 may request and initiate a video stream, which may require more downlink resources. Because UL-DL subframe configuration 0 has 2 subframes (e.g., subframes 0, 5) allocated for downlink communication, the base station 902 may determine that the current UL-DL subframe configuration does not support the anticipated downlink traffic. To adapt to the heavier downlink traffic, the base station 902 may reconfigure/change the UL-DL configuration and select UL-DL configuration 1, for example. In UL-DL configuration 1, subframes 4, 9 have been converted from uplink to downlink use. Upon changing the UL-DL subframe configuration for at least one radio frame, the base station 902 may transmit a configuration update message 914 to all UEs being served by the base station 902. In an aspect, the configuration update message 914 may be broadcasted. In another aspect, the configuration update message 914 may indicate a new UL-DL subframe configuration selected by the base station 902 and be associated with one or more radio frames. In another aspect, the configuration update message 914 may include an indicator (e.g., a configuration indicator) having two or more bits to indicate the subframe configuration (e.g., the two or more bits may be used to indicate a number between 0-6). The indicator may indicate a set of downlink subframes (e.g., subframes 0, 5 in configuration 0) and a set of uplink subframes (e.g., subframes 2, 3, 4, 7, 8, 9 in configuration 0). In an aspect, wireless devices within the wireless network 900 may be preconfigured with information that enables the wireless devices to associate various indicator values with different UL-DL subframe configurations. The first, second, and third UEs 904, 906, 908 may receive the configuration update message 914 and determine which subframes are allocated for uplink versus downlink transmission.

As previously discussed, in the example when UL-DL configuration 0 has been selected, the base station 902 may have allocated subframes 3, 4 to the first and second UEs 904, 906 for D2D transmissions. After the change in UL-DL configuration, subframe 4 is now allocated for downlink transmission. If the first UE 904 or the second UE 906 continues to perform D2D transmissions on subframe 4 while the base station 902 and the third UE 908 are also using subframe 4 for downlink communications, then the first and second UEs 904, 906 may cause interference to the base station 902 and/or the third UE 908. In an aspect, the configuration update message 914 may not indicate whether any new resources have been allocated for D2D transmissions. The configuration update message 914 may not indicate that resources previously allocated for D2D transmissions should no longer be used for D2D transmissions. As such, the first and second UEs 904, 906 may continue to use subframe 4 for D2D transmissions, which could lead to unintended interference.

To avoid such interference, the first and second UEs 904, 906 may monitor downlink transmissions for signaling (e.g., L1 signaling) from the base station 902. The signaling may indicate, before the occurrence of a resource, whether the resource previously allocated for D2D transmissions will be to be used for downlink transmission, and therefore, should no longer be used for D2D transmissions. The first and second UEs 904, 906 may perform such monitoring while in an RRC_IDLE and/or an RRC_CONNECTED state.

In one configuration, based on a decision to reconfigure the UL-DL configuration due to traffic patterns, the base station 902 may allocate different/new resources for D2D transmissions based on the reconfigured UL-DL configuration. For example, the base station 902 may identify the uplink subframes under the reconfigured UL-DL configuration and reserve a subset of resources (e.g., time-frequency resources) within the uplink subframes for scheduling assignment and for data transmission in D2D transmissions. In an aspect, the base station 902 may transmit (or broadcast) signaling that indicates newly allocated D2D resources in a D2D resource message 916. The D2D resource message 916 may indicate any resources (e.g., time-frequency resources associated with one or more subframes) newly allocated for D2D transmissions in one or more uplink subframes according to the reconfigured UL-DL subframe configuration. The resources allocated for D2D transmissions may be for one or more radio frames. In another aspect, the number of radio frames for which the resources are allocated may be indicated in the D2D resource message 916. In another aspect, the D2D resource message 916 may also identify any subframes that were previously allocated for uplink transmission in the previous UL-DL configuration that will be converted to downlink subframes. For example, the D2D resource message 916 may include a bitmap that indicates the uplink subframes associated with D2D transmissions that will be converted into downlink subframes for future radio frames. In an aspect, the base station 902 may transmit the D2D resource message 916 over a physical downlink control channel (PDCCH). In another aspect, the D2D resource message 916 may include a cyclic redundancy check (CRC) appended to the D2D resource message 916. The CRC may be scrambled with an identifier such as a radio network temporary identifier (RNTI). The RNTI may be a Broadcast D2D-RNTI, which may be a common RNTI known to all UEs interested in D2D transmissions. In an aspect, the identifier may be broadcast by the base station 902 in a system information block (SIB) (e.g., the base station 902 may send the Broadcast D2D-RNTI in a SIB1). By scrambling the CRC of the D2D resource message 916 with the identifier, UEs not interested in D2D transmissions may ignore the D2D resource message 916, and UEs interested in D2D transmissions (e.g., the first UE 904 and the second UE 906) may decode the D2D resource message 916 based on the identifier. Upon receiving the D2D resource message 916, the first and second UEs 904, 906 may decode the D2D resource message 916 using the identifier. After decoding the D2D resource message 916, the first and second UEs 904, 906 may determine that subframe 4, previously an uplink subframe containing resources for D2D transmissions, is now a downlink subframe. The first and second UEs 904, 906 may refrain from performing D2D transmissions on subframe 4 (and on any other subframes converted from uplink to downlink subframes). That is, in this example, the first and second UEs 904, 906 may not transmit or receive D2D communications on subframe 4. The first and second UEs 904, 906 may determine, based on the received D2D resource message 916, the resources allocated for D2D transmissions within one or more uplink subframes in the reconfigured UL-DL subframe configuration. In this configuration, an offset between when the D2D resource message 916 (or other L1 signaling) is sent and when the D2D resources occur may be fixed (e.g., predetermined) or configurable based on network signaling.

In another configuration, based on a decision to reconfigure the UL-DL subframe configuration, the base station 902 may have more detailed information regarding D2D transmissions to send to the first and second UEs 904, 906. In this configuration, the D2D resource message 916 may not be able to transmit all of the detailed information in the PDCCH. Instead, the base station 902 may transmit the D2D resource message 916 to indicate a resource (e.g., a set of time-frequency resources) on which a D2D information message 918 will be transmitted. Similar to the D2D resource message 916 discussed in the previous configuration, the D2D information message 918 may indicate resources for D2D transmissions in a reconfigured UL-DL subframe configuration. Unlike in the previous configuration, however, the D2D information message 918 may be used to indicate resources allocated for D2D transmissions rather than the D2D resource message 916. In this configuration, the D2D resource message 916 may enable the first and second UEs 904, 906 to locate the D2D information message 918. The D2D information message 918 may indicate the resources for D2D transmissions in a greater number of radio frames than could be indicated in the D2D resource message 916 in the previously discussed configuration. The D2D information message 918 may indicate that the D2D resources have been allocated for an indicated number of radio frames. In other words, the D2D information message 918 may carry more information/data than D2D resource message 916. The D2D information message 918 may indicate which uplink subframes have been converted to downlink subframes. The D2D information message 918 may also include parameters associated with one or more D2D communication links. Such parameters may include a suggested transmission power for D2D transmissions, a suggested modulation and coding scheme (MCS) for D2D transmissions, and/or a bitmap that indicates the uplink subframes associated with D2D transmissions that will be converted into downlink subframes for future radio frames. In an aspect, a bitmap carried by the D2D information message 918 may be larger than a bitmap carried by the D2D resource message 916. In another aspect, the base station 902 may transmit the D2D resource message 916 over a PDCCH and transmit the D2D information message 918 over a PDSCH. In this configuration, an offset between when the D2D resource message 918 (or other L1 signaling) is sent and when the D2D resources occur may be fixed or configurable.

Having determined the allocated D2D resources based on the received D2D resource message 916 and/or the received D2D information message 918, the first and second UEs 904, 906 may determine a subset of the allocated D2D resources to be used for performing D2D transmissions. In an aspect, if the first UE 904 has a large amount of data to send, then the first UE 904 may select a larger subset of the allocated D2D resources to use for the D2D transmissions 910. In another aspect, if the first UE 904 has less data to send, then the first UE 904 may select a smaller subset of the allocated D2D resources to use for the D2D transmissions 910. In yet another aspect, resource selection may also be based on priority of the data to be transmitted. If the first UE 904 has high priority data for transmission, then the first UE 904 may select a larger subset of the allocated D2D resources, but if the first UE 904 has low priority data for transmission, then the first UE 904 may select a smaller subset of the allocated D2D resources and leave the remaining resources for other UEs. Similarly, if other UEs in the wireless network 900 are engaging in D2D transmissions (e.g., D2D communications), the first UE 904 may select the subset of D2D resources based on an energy detection level on the D2D resources. The first UE 904 may select a subset of resources with a comparatively lower energy detection level to minimize interference with other D2D transmissions. In another aspect, the D2D resource message 916 or the D2D information message 918 may indicate which resources are allocated to which UEs for D2D transmissions based on a UE identifier (e.g., a MAC address). In this aspect, the first UE 904 may determine the subset of resources to use for D2D transmissions based on which resources are associated with the identifier of the first UE 904. In another aspect, the subset of allocated D2D resources selected by the first UE 904 may include all the resources allocated for D2D transmissions.

Figure 10:
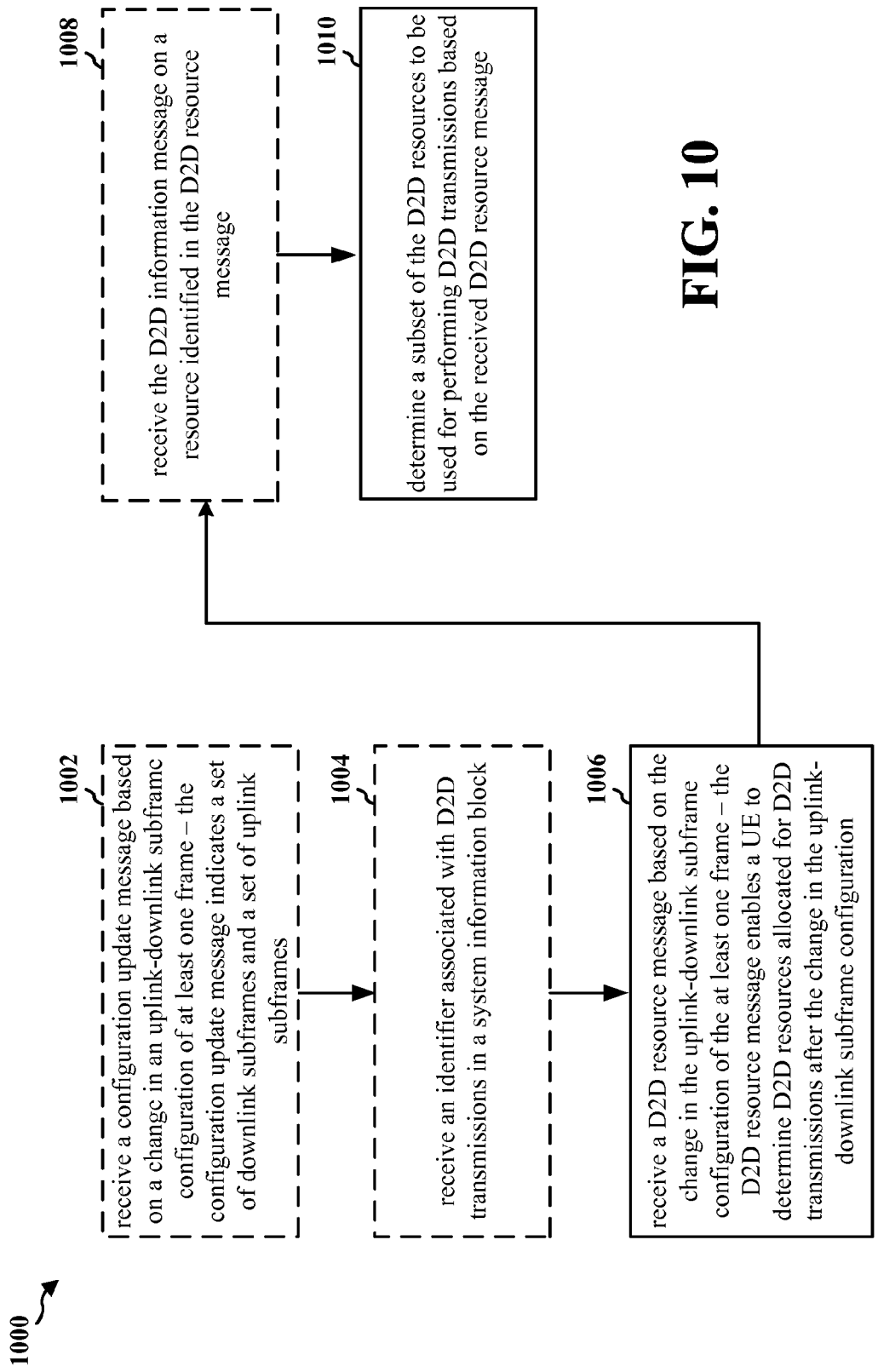
FIG. 10 is a flowchart of a method of wireless communication.

FIG. 10 is a flowchart 1000 of a method of wireless communication. The method may be performed by a UE (e.g., the first UE 904, the second UE 906, the apparatus 1202/1202', infra). At block 1002, the UE may receive a configuration update message based on a change in an uplink-downlink subframe configuration of at least one frame. The configuration update message may indicate a set of downlink subframes and a set of uplink subframes. For example, referring to FIG. 9, the first UE 904 may receive the configuration update message 914 based on a change in the UL-DL subframe configuration (e.g., from configuration 0 to configuration 1) of at least one frame. The configuration update message 914 may indicate a set of downlink subframes (0, 4, 5, 9) and a set of uplink subframes (2, 3, 7, 8).

At block 1004, the UE may receive an identifier associated with D2D transmissions in a system information block. For example, referring to FIG. 9, the first UE 904 may receive a Broadcast D2D-RNTI associated with D2D transmissions from the base station 902 in a SIB1.

At block 1006, the UE may receive a D2D resource message based on the change in the uplink-downlink subframe configuration of the at least one frame. The D2D resource message may enable the UE to determine D2D resources allocated for D2D transmissions after the change in the uplink-downlink subframe configuration. In one configuration, the D2D resource message may indicate the D2D resources, in a set of uplink subframes, allocated for D2D transmissions. In this configuration, the D2D resource message may be transmitted in a PDCCH. In another configuration, the D2D resource message may identify resources on which a D2D information message will be transmitted, and the D2D information message may indicate the D2D resources, in a set of uplink subframes, allocated for D2D transmissions. For example, referring to FIG. 9, the first UE 904 may receive the D2D resource message 916 based on the change in the UL-DL subframe configuration of at least one radio frame. The D2D resource message 916 may enable the first UE 904 to determine D2D resources allocated for D2D transmissions after the change in the UL-DL subframe configuration from configuration 0 to configuration 1. In one aspect, the D2D resource message 916 may be transmitted on the PDCCH and may indicate the D2D resources, in a set of uplink subframes (e.g., subframes 3, 7 of configuration 1), allocated for D2D transmissions. In another aspect, the D2D resource message 916 may identify a resource on which the D2D information message 918 will be transmitted. In this aspect, the D2D information message 918 may indicate the D2D resources, in a set of uplink subframes (e.g., subframes 3, 7 of configuration 1), allocated for D2D transmissions.

At block 1008, the UE may receive the D2D information message on a resource identified in the D2D resource message. In an aspect, the D2D resource message may be received in a PDCCH and the D2D information message may be received in a PDSCH. In another aspect, the D2D information message may include a bitmap that indicates one or more subframes of the at least one frame that will be converted to a downlink subframe or converted to an uplink subframe based on the change in the uplink-downlink subframe configuration. For example, referring to FIG. 9, the first UE 904 may receive the D2D information message 918 on the resource identified in the D2D resource message 916. In this example, the D2D resource message 916 may be received in the PDCCH and the D2D information message 918 may be received in the PDSCH. In an aspect, the D2D information message 918 may include a bitmap that indicates that subframes 4, 9 of the next 12 radio frames will be converted to a downlink subframe based on the change in the UL-DL subframe configuration.

Finally, at block 1010, the UE may determine a subset of the D2D resources to be used for performing D2D transmissions based on the received D2D resource message. In an aspect, the UE may determine the subset of the D2D resources to be used for performing D2D transmissions by identifying a downlink subframe previously configured as an uplink subframe and previously associated with resources allocated for D2D transmissions and refrain from performing D2D transmissions on the identified downlink subframe. In another aspect, the UE may determine the subset of D2D resources to be used for performing D2D transmissions by decoding the D2D resources message based on an identifier associated with D2D transmissions. For example, referring to FIG. 9, the first UE 904 may determine a subset of the D2D resources to be used for performing D2D transmissions with the second UE 906 based on the received D2D resource message 916. The first UE 904 may use the Broadcast D2D-RNTI to decode the D2D resource message 916. In an aspect, the D2D resource message 916 may indicate the D2D resources for D2D transmissions. In another aspect, the D2D resource message 916 may provide the resource(s) for receiving the D2D information message 918, and the first UE 904 may receive the D2D information message 918 on the resource(s) indicated by the D2D resource message 916. In this aspect, the first UE 904 may decode the D2D information message 918 and determine the resources allocated for D2D transmissions. Having determined the D2D resources indicated in either the D2D resource message 916 or the D2D information message 918, the first UE 904 may use a subset of the D2D resources allocated for D2D transmissions. In an aspect, the subset may include all of the D2D resources allocated for D2D transmissions. In another aspect, the subset may include a portion of the D2D resources allocated for D2D transmissions. If the subset includes the portion of the D2D resources, then the portion may be selected based on an energy detection level of the available D2D resources, a priority of transmission of the first UE 904, and/or specific resource assignments to the first UE 904 indicated in the D2D resource message 916 or the D2D information message 918.

Figure 11:
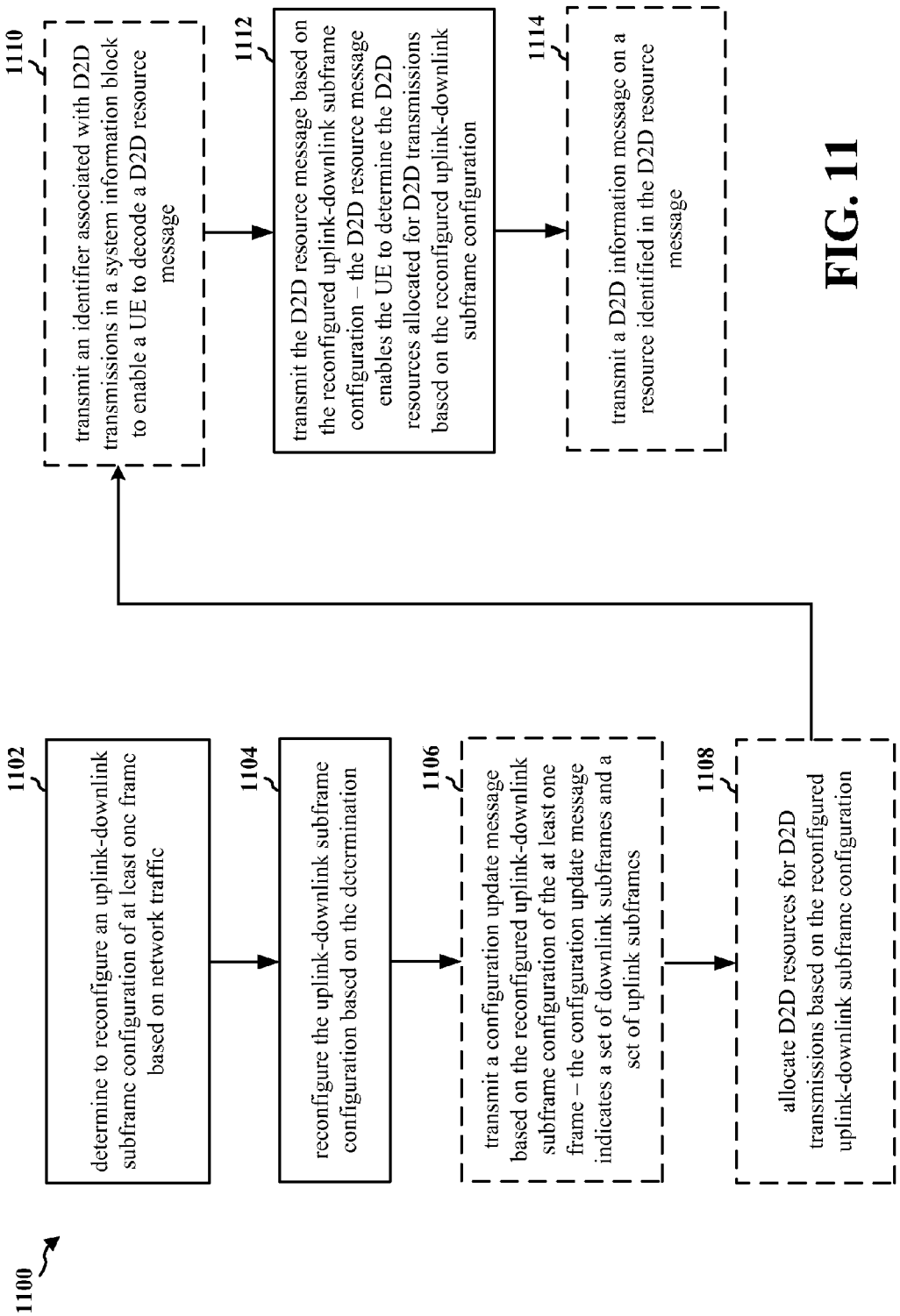
FIG. 11 is a flowchart of a method of wireless communication.

FIG. 11 is a flowchart 1100 of a method of wireless communication. The method may be performed by a base station (e.g., the base station 902, the apparatus 1402/1402', infra). At 1102, the base station may determine to reconfigure an uplink-downlink subframe configuration of at least one frame based on network traffic. For example, referring to FIG. 9, the base station 902 may determine to reconfigure an UL-DL subframe configuration of at least one radio frame based on the traffic in the wireless network 900. In this example, the base station 902 may receive a request from the third UE 908 requesting additional downlink transmissions (e.g., to support a video streaming service). The base station 902 may be using UL-DL subframe configuration 0 and may determine that the current configuration does not have enough downlink subframes to support the throughput required by the third UE 908. Accordingly, the base station 902 may determine that additional downlink subframes are required. In an aspect, the base station 902 may determine the amount of downlink subframes needed to support the traffic throughput. For example, the base station 902 may determine that 2 more downlink subframes are needed.

At block 1104, the base station may reconfigure the uplink-downlink subframe configuration based on the determination. For example, referring to FIG. 9, the base station 902 may reconfigure the UL-DL subframe configuration based on the determination that reconfiguration is needed. In an aspect, the base station 902 may identify one or more UL-DL subframe configurations that have more downlink subframes than a current UL-DL subframe configuration and switch to anyone of the identified one or more UL-DL subframe configurations. In another aspect, the base station 902 may determine the number of additional downlink subframes required to support the additional network downlink (e.g., 2 more downlink subframes), identify one or more UL-DL subframe configurations that satisfy the requirement, and switch to the one or more UL-DL subframe configuration (e.g., the base station 902 may reconfigure the UL-DL subframe configuration from configuration 0 to configuration 1).

At block 1106, the base station may transmit a configuration update message based on the reconfigured uplink-downlink subframe configuration of the at least one frame. The configuration update message may indicate a set of downlink subframes and a set of uplink subframes. For example, referring to FIG. 9, the base station 902 may transmit the configuration update message 914 based on the reconfigured UL-DL subframe configuration of the at least one radio frame. The configuration update message 914 may indicate a set of downlink subframes (e.g., subframes 0, 4, 5, 9) and a set of uplink subframes (e.g., 2, 3, 7, 8). In an aspect, the configuration update message 914 may indicate the set of downlink subframes and the set of uplink subframes by a bit indicator (e.g., 2-bit indicator) that corresponds to a configuration number (configuration 0-6).

At block 1108, the base station may allocate D2D resources for D2D transmissions based on the reconfigured uplink-downlink subframe configuration. In an aspect, the reconfigured uplink-downlink subframe configuration may have less uplink subframes than a previous uplink-downlink subframe configuration, and a subset of the D2D resources are allocated on a subset of uplink subframes not previously allocated for D2D transmissions in the previous uplink-downlink subframe configuration. For example, referring to FIG. 9, the base station 902 may allocate D2D resources for D2D transmissions based on the reconfiguration UL-DL subframe configuration. The base station 902 may determine that configuration 1 is the new UL-DL subframe configuration. Configuration 1 may have less uplink subframes (e.g., 4 uplink subframes) than configuration 0 (e.g., 6 uplink subframes). The base station 902 may determine that, in configuration 1, subframes 2, 3, 7, 8 are uplink subframes. The base station 902 may allocate D2D resources within the subframes 3, 7 of configuration 1 (versus subframes 3, 4 of configuration 0). In aspect, the base station 902 may allocate specific D2D resources to specific UEs (e.g., the first UE 904 and the second UE 906). In this aspect, the allocation may be based on a distance between the base station 902 and the UE. In another aspect, if only a part of the D2D resources previously available for D2D transmissions continue to be available under the reconfigured UL-DL subframe configuration, then some of the D2D resources can be reassigned. For example, if scheduling assignment resources are used for downlink, then there may not be much value in having data resources associated with the same scheduling assignment resources. As such, the base station 902 may convert/reallocate some of the data resources into scheduling assignment resources.

At block 1110, the base station may transmit an identifier associated with D2D transmissions in a system information block to enable a UE to decode a D2D resource message. For example, the base station 902 may transmit a Broadcast D2D-RNTI associated with D2D transmissions in a SIB1 to enable the first UE 904 to decode the D2D resource message 916.

At block 1112, the base station may transmit the D2D resource message based on the reconfigured uplink-downlink subframe configuration. The D2D resource message may enable the UE to determine the D2D resources allocated for D2D transmissions based on the reconfigured uplink-downlink subframe configuration. In an aspect, the D2D resource message may indicate the D2D resources allocated in a set of uplink subframes. In another aspect, the D2D resource message may identify a resource on which a D2D information message will be transmitted. The D2D information message may indicate the D2D resources allocated in a set of uplink subframes based on the reconfigured uplink-downlink subframe configuration. For example, referring to FIG. 9, the base station 902 may transmit the D2D resource message 916 based on the reconfigured UL-DL subframe configuration. The D2D resource message 916 enables the first UE 904 to determine the D2D resources allocated for D2D transmissions based on the reconfigured UL-DL subframe configuration. In aspect, the D2D resource message 916 may indicate the D2D resources allocated in uplink subframes 3 and 7. In another aspect, the D2D resource message 916 identifies a resource on which the D2D information message 918 will be transmitted (e.g., one or more symbols and associated subcarriers), and the D2D information message will indicate the D2D resources allocated in the uplink subframes 3, 7 based on configuration 1.

Finally, at block 1114, the base station may transmit the D2D information message on the resource identified in the D2D resource message. For example, referring to FIG. 9, the base station 902 may transmit the D2D information message 918 on the resource identified in the D2D resource message 916. The D2D resource message 916 may be transmitted on the PDCCH, and the D2D information message 918 may be transmitted on the PDSCH.

Figure 12:
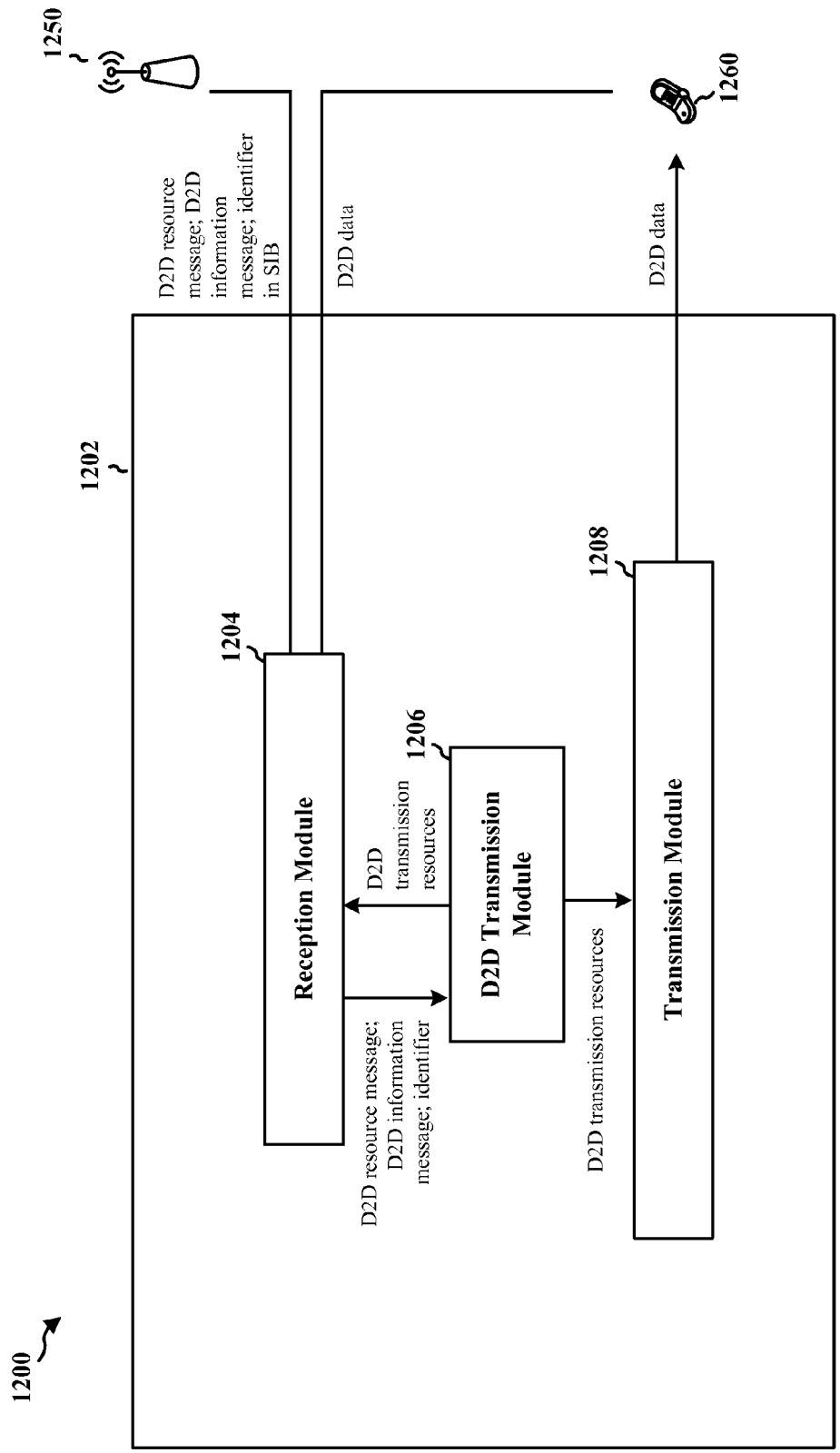
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a reception module 1204, a D2D transmission module 1206, and a transmission module 1208. The reception module 1204 may be configured to receive a D2D resource message from a base station 1250 based on a change in an uplink-downlink subframe configuration of at least one frame. The D2D resource message may enable the apparatus to determine D2D resources allocated for D2D transmissions after the change in the uplink-downlink subframe configuration. The D2D transmission module 1206 may be configured to determine a subset of the D2D resources to be used for performing D2D transmissions with a UE 1260 based on the received D2D resource message. In one configuration, the reception module 1204 may be configured to receive a configuration update message from the base station 1250 based on the change in the uplink-downlink subframe configuration of the at least one frame. The configuration update message may indicate a set of downlink subframes and a set of uplink subframes. In another configuration, the D2D transmission module 1206 may be configured to determine the subset of D2D resources to be used for performing D2D transmissions by identifying a downlink subframe previously configured as an uplink subframe and previously associated with resources allocated for D2D transmission and by refraining from performing D2D transmission on the identified downlink subframe. In another configuration, the D2D transmission module 1206 may be configured to determine the subset of D2D resources to be used for performing D2D transmissions by decoding the D2D resource message based on an identifier associated with D2D transmissions. In this configuration, the reception module 1204 may be configured to receive the identifier associated with D2D transmissions in a system information block. In an aspect, the D2D resource message may indicate the D2D resources, in a set of uplink subframes, allocated for D2D transmissions. In another aspect, the D2D resource message may be transmitted in a PDCCH. In another configuration, the D2D resource message may identify resources on which a D2D information message will be transmitted, and the D2D information message may indicate the D2D resources, in a set of uplink subframes, allocated for D2D transmissions. In this configuration, the reception module 1204 may be configured to receive the D2D information message on the resource identified in the D2D resource message. In an aspect, the D2D resource message may be received in a PDCCH and the D2D information message may be received in a PDSCH. In another aspect, the D2D information message may include a bitmap that indicates one or more subframes of the at least one frame that will be converted to a downlink subframe or converted to an uplink subframe based on the change in the uplink-downlink subframe configuration.

The apparatus may include additional modules that perform each of the blocks of the algorithm in the aforementioned flowchart of FIG. 10. As such, each block in the aforementioned flowchart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
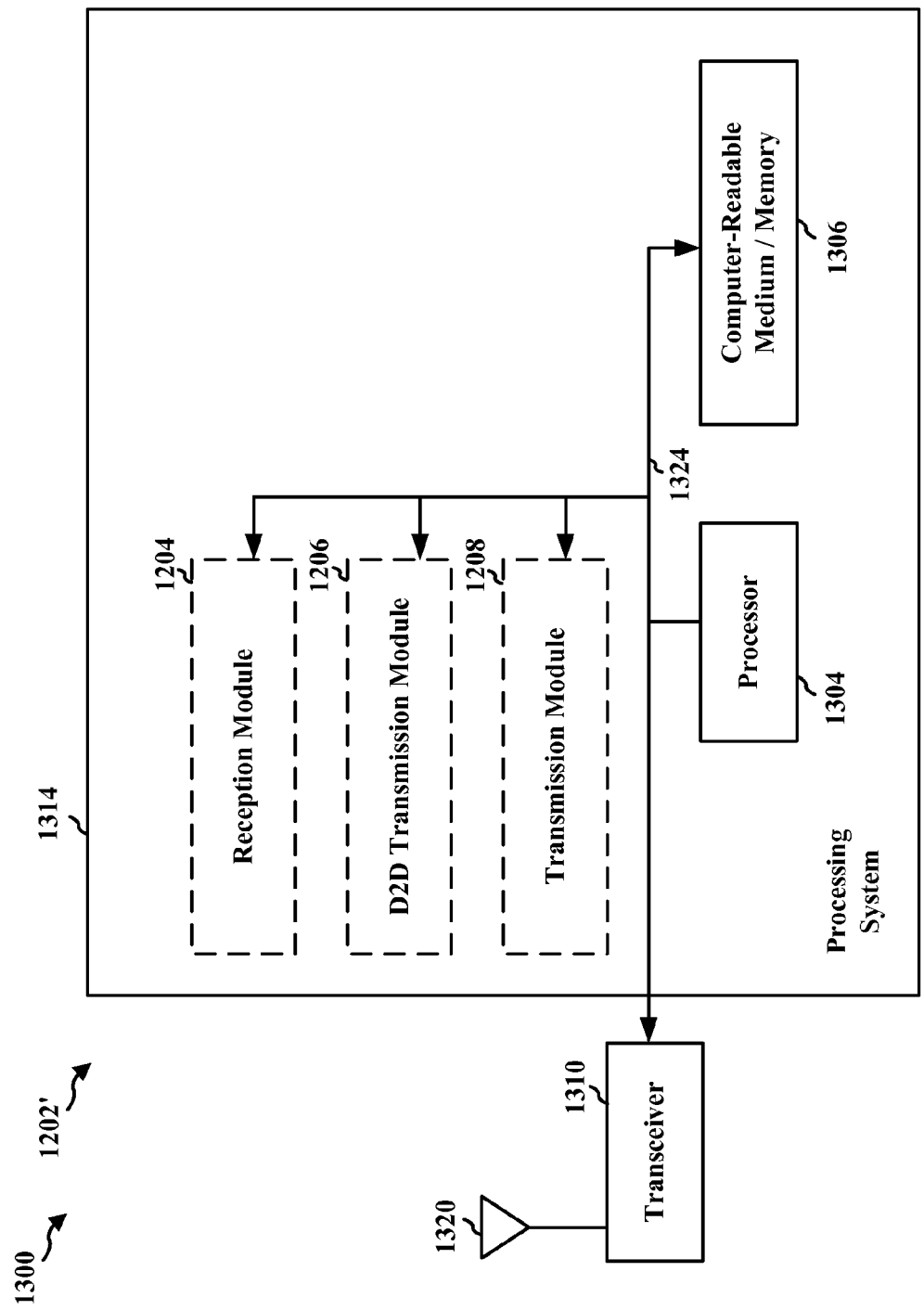
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception module 1204. In addition, the transceiver 1310 receives information from the processing system 1314, specifically the transmission module 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving a D2D resource message based on a change in an uplink-downlink subframe configuration of at least one frame. The D2D resource message may enable the apparatus to determine D2D resources allocated for D2D transmissions after the change in the uplink-downlink subframe configuration. The apparatus includes means for determining a subset of the D2D resources to be used for performing D2D transmissions based on the received D2D resource message. The apparatus may include means for receiving a configuration update message based on the change in the uplink-downlink subframe configuration of the at least one frame. The configuration update message may indicate a set of downlink subframes and a set of uplink subframes. In an aspect, the means for determining the subset of D2D resources to be used for performing D2D transmissions may be configured to identify a downlink subframe previously configured as an uplink subframe and previously associated with resources allocated for D2D transmission and to refrain from performing D2D transmission on the identified downlink subframe. In an aspect, the means for determining the subset of D2D resources to be used for performing D2D transmissions may be configured to decode the D2D resource message based on an identifier associated with D2D transmissions. In this aspect, the apparatus may include means for receiving the identifier associated with D2D transmissions in a system information block. In another aspect, the D2D resource message may indicate the D2D resources, in a set of uplink subframes, allocated for D2D transmissions. In another aspect, the D2D resource message may be transmitted in a PDCCH. In another aspect, the D2D resource message may identify resources on which a D2D information message will be transmitted. The D2D information message may indicate the D2D resources, in a set of uplink subframes, allocated for D2D transmissions. In another aspect, the apparatus may include means for receiving the D2D information message on the resource identified in the D2D resource message. In another aspect, the D2D resource message may be received in a PDCCH and the D2D information message may be received in a PDSCH. In another aspect, the D2D information message may include a bitmap that indicates one or more subframes of the at least one frame that will be converted to a downlink subframe or converted to an uplink subframe based on the change in the uplink-downlink subframe configuration. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
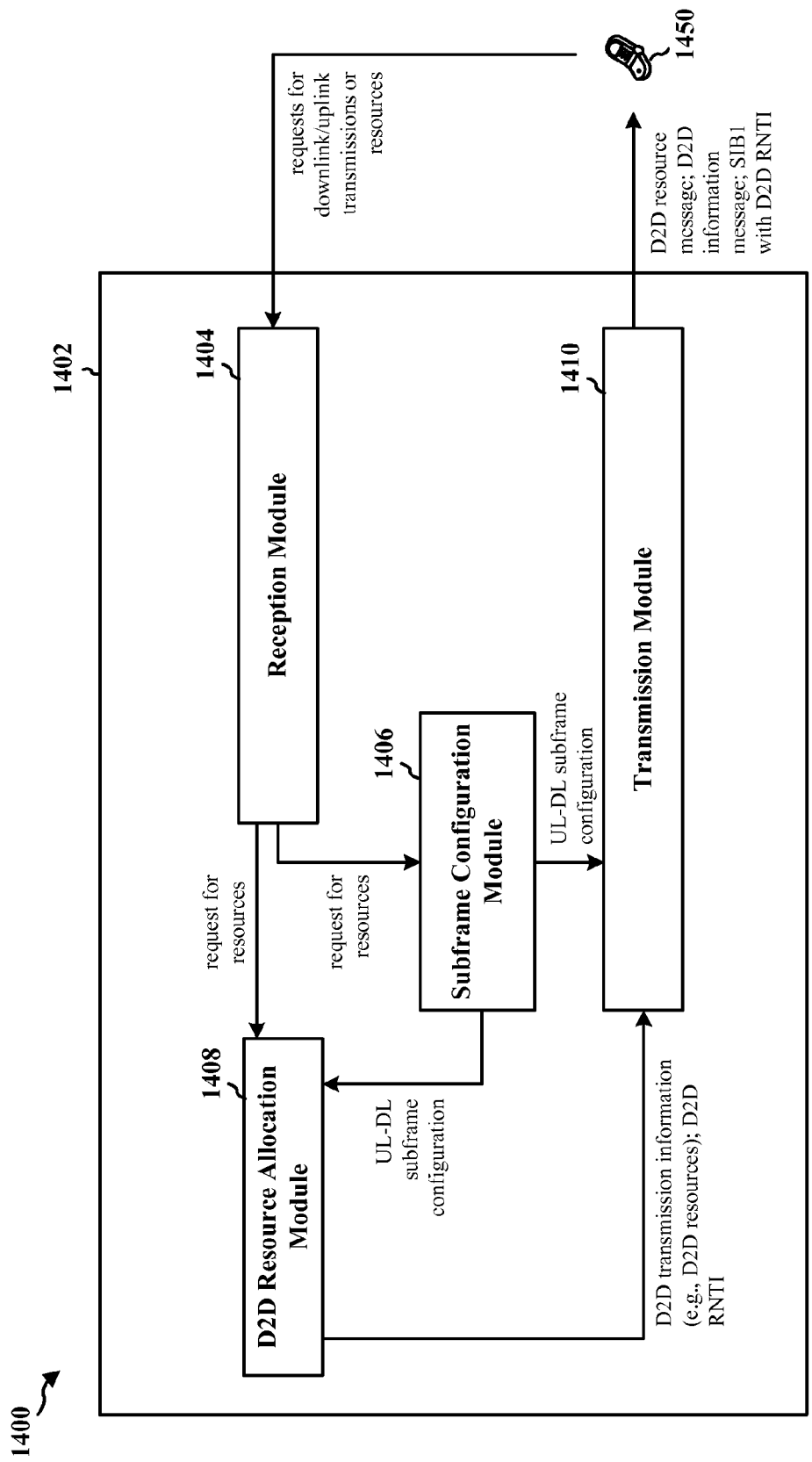
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a base station (e.g., an eNB). The apparatus includes a reception module 1404, a subframe configuration module 1406, a D2D resource allocation module 1408, and a transmission module 1410. The subframe configuration module 1406 may be configured to determine to reconfigure an uplink-downlink subframe configuration of at least one frame based on network traffic. The subframe configuration module 1406 may be configured to reconfigure the uplink-downlink subframe configuration based on the determination. The transmission module 1410 may be configured to transmit a D2D resource message based on the reconfigured uplink-downlink subframe configuration. The D2D resource message may enable a UE 1450 to determine D2D resources allocated for D2D transmissions based on the reconfigured uplink-downlink subframe configuration. The D2D resource allocation module 1408 may be configured to allocate the D2D resources for D2D transmissions based on the reconfigured uplink-downlink subframe configuration. In an aspect, the reconfigured uplink-downlink subframe configuration may have less uplink subframes than a previous uplink-downlink subframe configuration, and a subset of the D2D resources may be allocated on a subset of uplink subframes not previously allocated for D2D transmissions in the previous uplink-downlink subframe configuration. In one configuration, the transmission module 1410 may be configured to transmit a configuration update message based on the reconfigured uplink-downlink subframe configuration of the at least one frame. The configuration update message may indicate a set of downlink subframes and a set of uplink subframes. In another configuration, the transmission module 1410 may be configured to transmit an identifier associated with D2D transmissions in a system information block to enable the UE 1450 to decode the D2D resource message. In an aspect, the D2D resource message may indicate the D2D resources allocated in a set of uplink subframes. In another aspect, the D2D resource message may identify resources on which a D2D information message will be transmitted. The D2D information message may indicate the D2D resources allocated in a set of uplink subframes based on the reconfigured uplink-downlink subframe configuration. In another configuration, the transmission module 1410 may be configured to transmit the D2D information message on the resource identified in the D2D resource message. In this configuration, the D2D resource message may be transmitted in a PDCCH and the D2D information message may be transmitted in a PDSCH.

The apparatus may include additional modules that perform each of the blocks of the algorithm in the aforementioned flowchart of FIG. 11. As such, each block in the aforementioned flowchart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
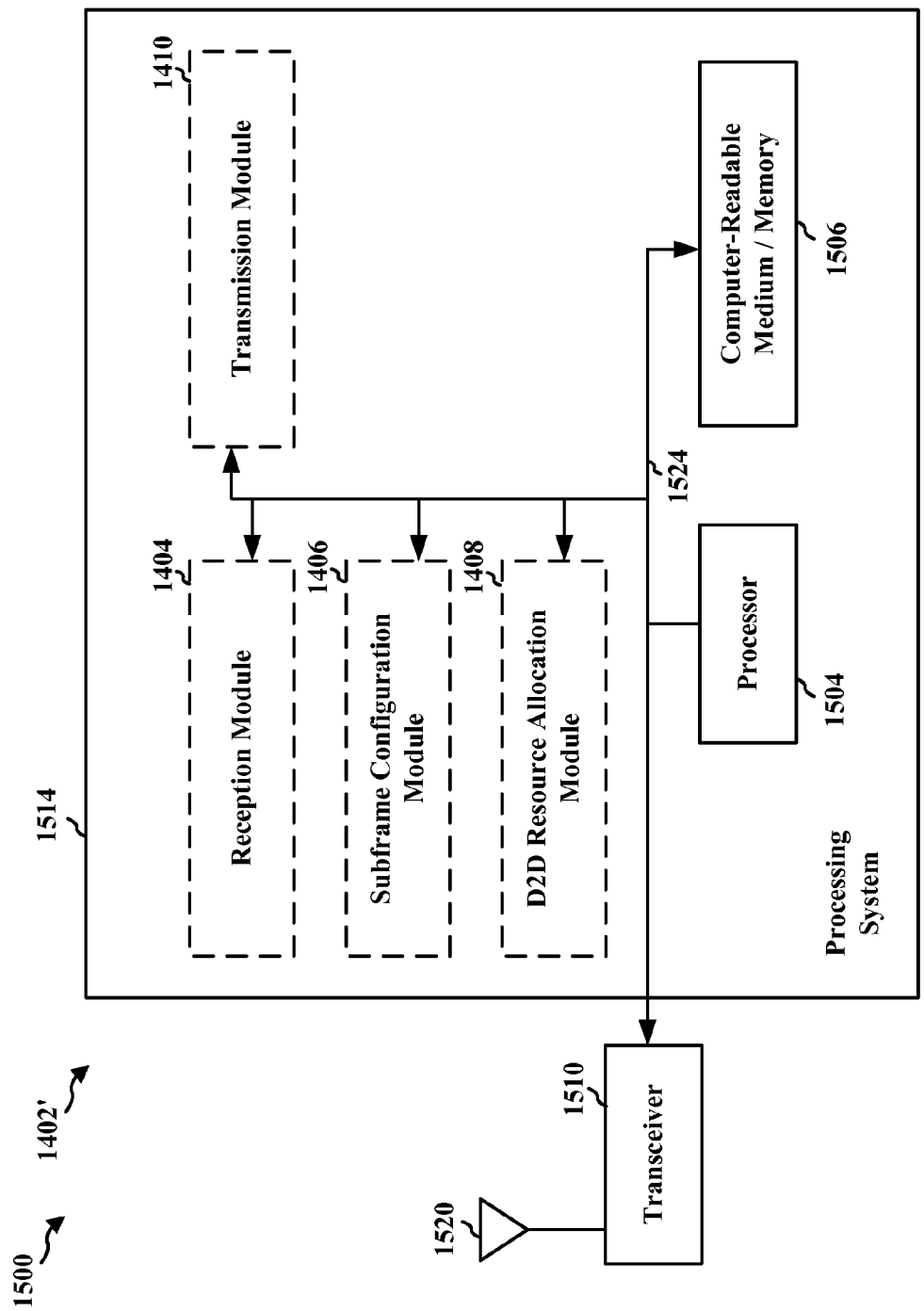
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1404. In addition, the transceiver 1510 receives information from the processing system 1514, specifically the transmission module 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410. The modules may be software modules running in the processor 1504, resident/stored in the computer readable medium/memory 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means for determining to reconfigure an uplink-downlink subframe configuration of at least one frame based on network traffic. The apparatus includes means for reconfiguring the uplink-downlink subframe configuration based on the determination. The apparatus includes means for transmitting a D2D resource message based on the reconfigured uplink-downlink subframe configuration. The D2D resource message may enable a UE to determine D2D resources allocated for D2D transmissions based on the reconfigured uplink-downlink subframe configuration. The apparatus may include means for allocating the D2D resources for D2D transmissions based on the reconfigured uplink-downlink subframe configuration. In an aspect, the reconfigured uplink-downlink subframe configuration may have less uplink subframes than a previous uplink-downlink subframe configuration, and a subset of the D2D resources may be allocated on a subset of uplink subframes not previously allocated for D2D transmissions in the previous uplink-downlink subframe configuration. In another aspect, the apparatus may include means for transmitting a configuration update message based on the reconfigured uplink-downlink subframe configuration of the at least one frame. The configuration update message may indicate a set of downlink subframes and a set of uplink subframes. In another aspect, the apparatus may include means for transmitting an identifier associated with D2D transmissions in a system information block to enable the UE to decode the D2D resource message. In another aspect, the D2D resource message may indicate the D2D resources allocated in a set of uplink subframes. In another aspect, the D2D resource message may identify resources on which a D2D information message will be transmitted. In this aspect, the D2D information message may indicate the D2D resources allocated in a set of uplink subframes based on the reconfigured uplink-downlink subframe configuration. In another aspect, the apparatus may include means for transmitting the D2D information message on the resource identified in the D2D resource message. In another aspect, the D2D resource message may be transmitted in a PDCCH and the D2D information message may be transmitted in a PDSCH. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a wireless communication by a user equipment (UE), comprising:
   receiving a device-to-device (D2D) resource message based on a change in an uplink-downlink subframe configuration of at least one frame, wherein the D2D resource message enables the UE to determine D2D resources allocated for D2D transmissions and the number of radio frames for which the D2D resources are allocated after the change in the uplink-downlink subframe configuration; and
   determining a subset of the D2D resources in the number of radio frames to be used for performing D2D transmissions based on the received D2D resource message.

2. The method of claim 1, further comprising receiving a configuration update message based on the change in the uplink-downlink subframe configuration of the at least one frame, wherein the configuration update message indicates a set of downlink subframes and a set of uplink subframes.

3. The method of claim 1, wherein the determining the subset of D2D resources to be used for performing D2D transmissions comprises:
   identifying a downlink subframe previously configured as an uplink subframe and previously associated with resources allocated for D2D transmissions; and
   refraining from performing D2D transmissions on the identified downlink subframe.

4. The method of claim 1, wherein the determining the subset of D2D resources to be used for performing D2D transmissions comprises decoding the D2D resource message based on an identifier associated with D2D transmissions.

5. The method of claim 4, further comprising receiving the identifier associated with D2D transmissions in a system information block.

6. The method of claim 1, wherein the D2D resource message indicates the D2D resources, in a set of uplink subframes, allocated for D2D transmissions.

7. The method of claim 6, wherein the D2D resource message is transmitted in a physical downlink control channel (PDCCH).

8. The method of claim 1, wherein the D2D resource message identifies a resource on which a D2D information message will be transmitted, and wherein the D2D information message indicates the D2D resources, in a set of uplink subframes, allocated for D2D transmissions.

9. The method of claim 8, further comprising receiving the D2D information message on the resource identified in the D2D resource message.

10. The method of claim 9, wherein the D2D resource message is received in a physical downlink control channel (PDCCH) and the D2D information message is received in a physical downlink shared channel (PDSCH).

11. The method of claim 9, wherein the D2D information message comprises a bitmap that indicates one or more subframes of the at least one frame that will be converted to a downlink subframe or converted to an uplink subframe based on the change in the uplink-downlink subframe configuration.

12. A method of wireless communication by a base station, comprising:
 determining to reconfigure an uplink-downlink subframe configuration of at least one frame based on network traffic;
 reconfiguring the uplink-downlink subframe configuration based on the determination; and
 transmitting a device-to-device (D2D) resource message based on the reconfigured uplink-downlink subframe configuration, wherein the D2D resource message enables a user equipment (UE) to determine D2D resources allocated for D2D transmissions and the number of radio frames for which the D2D resources are allocated based on the reconfigured uplink-downlink subframe configuration.

13. The method of claim 12, further comprising allocating the D2D resources for D2D transmissions based on the reconfigured uplink-downlink subframe configuration.

14. The method of claim 12, wherein the reconfigured uplink-downlink subframe configuration has less uplink subframes than a previous uplink-downlink subframe configuration, and wherein a subset of the D2D resources are allocated on a subset of uplink subframes not previously allocated for D2D transmissions in the previous uplink-downlink subframe configuration.

15. The method of claim 12, further comprising transmitting a configuration update message based on the reconfigured uplink-downlink subframe configuration of the at least one frame, wherein the configuration update message indicates a set of downlink subframes and a set of uplink subframes.

16. The method of claim 12, further comprising transmitting an identifier associated with D2D transmissions in a system information block to enable the UE to decode the D2D resource message.

17. The method of claim 12, wherein the D2D resource message indicates the D2D resources allocated in a set of uplink subframes.

18. The method of claim 12, wherein the D2D resource message identifies a resource on which a D2D information message will be transmitted, and wherein the D2D information message indicates the D2D resources allocated in a set of uplink subframes based on the reconfigured uplink-downlink subframe configuration.

19. The method of claim 18, further comprising transmitting the D2D information message on the resource identified in the D2D resource message.

20. The method of claim 19, wherein the D2D resource message is transmitted in a physical downlink control channel (PDCCH) and the D2D information message is transmitted in a physical downlink shared channel (PDSCH).

21. An apparatus for wireless communication, comprising:
 a memory; and
 at least one processor coupled to the memory and configured to:
  receive a device-to-device (D2D) resource message based on a change in an uplink-downlink subframe configuration of at least one frame, wherein the D2D resource message enables the apparatus to determine D2D resources allocated for D2D transmissions and the number of radio frames for which the D2D resources are allocated after the change in the uplink-downlink subframe configuration; and
  determine a subset of the D2D resources in the number of radio frames to be used for performing D2D transmissions based on the received D2D resource message.

22. The apparatus of claim 21, wherein the at least one processor is further configured to receive a configuration update message based on the change in the uplink-downlink subframe configuration of the at least one frame, wherein the configuration update message indicates a set of downlink subframes and a set of uplink subframes.

23. The apparatus of claim 21, wherein the at least one processor is configured to determine the subset of the D2D resources to be used for performing D2D transmissions by decoding the D2D resource message based on an identifier associated with D2D transmissions.

24. The apparatus of claim 21, wherein the D2D resource message identifies a resource on which a D2D information message will be transmitted, and wherein the D2D information message indicates the D2D resources, in a set of uplink subframes, allocated for D2D transmissions.

25. An apparatus for wireless communication, comprising:
 a memory; and
 at least one processor coupled to the memory and configured to:
  determine to reconfigure an uplink-downlink subframe configuration of at least one frame based on network traffic;
  reconfigure the uplink-downlink subframe configuration based on the determination; and
  transmit a device-to-device (D2D) resource message based on the reconfigured uplink-downlink subframe configuration, wherein the D2D resource message enables a user equipment (UE) to determine D2D resources allocated for D2D transmissions and the number of radio frames for which the D2D resources are allocated based on the reconfigured uplink-downlink subframe configuration.

26. The apparatus of claim 25, wherein the at least one processor is further configured to allocate the D2D resources for D2D transmissions based on the reconfigured uplink-downlink subframe configuration.

27. The apparatus of claim 25, wherein the at least one processor is further configured to transmit an identifier associated with D2D transmissions in a system information block to enable the UE to decode the D2D resource message.

28. The apparatus of claim 25, wherein the D2D resource message indicates the D2D resources allocated in a set of uplink subframes.

29. The apparatus of claim 25, wherein the D2D resource message identifies a resource on which a D2D information message will be transmitted, and wherein the D2D information message indicates the D2D resources allocated in a set of uplink subframes based on the reconfigured uplink-downlink subframe configuration.

30. The apparatus of claim 29, wherein the at least one processor is further configured to transmit the D2D information message on the resource identified in the D2D resource message.

\* \* \* \* \*